United States Patent [19]
Hu et al.

[11] Patent Number: 6,147,159
[45] Date of Patent: Nov. 14, 2000

[54] COMPOSITIONS FOR ORGANIC SYNTHESIS ON SOLID PHASE AND METHODS OF USING THE SAME

[75] Inventors: Yonghan Hu, Burlington, Mass.; Jeffrey W. Labadie, Sunnyvale, Calif.; John Anthony Porco, Jr., Reedwood City, Calif.; Barry Martin Trost, Los Altos, Calif.

[73] Assignee: Argonaut Technologies, San Carlos, Calif.

[21] Appl. No.: 09/163,889

[22] Filed: Sep. 30, 1998

[51] Int. Cl.$^7$ ............................................. C08F 8/00
[52] U.S. Cl. ............................................. 525/106; 528/10
[58] Field of Search ............................... 525/106; 528/10

[56] References Cited

U.S. PATENT DOCUMENTS

| | | | |
|---|---|---|---|
| 5,663,245 | 9/1997 | Kennedy et al. | 525/479 |
| 5,773,512 | 6/1998 | Chenera et al. | 525/100 |
| 5,859,277 | 1/1999 | Whitlock et al. | 556/400 |

FOREIGN PATENT DOCUMENTS

| | | |
|---|---|---|
| 2 536 752 A1 | 1/1984 | France . |
| 2 616 152 A1 | 9/1988 | France . |
| 4234898 C1 | 7/1994 | Germany . |
| WO97/44367 | 11/1997 | WIPO . |
| WO98/05671 | 2/1998 | WIPO . |
| WO98/17695 | 4/1998 | WIPO . |

OTHER PUBLICATIONS

Muzafarov, A. et al., "Degradable Hyperbranched Poly-(bis(undecenyloxy)methylsilane)s", *Macromolecules*, vol. 28, No. 24, Nov. 20, 1995, pp. 8444–8446.

Chenera, B. et al., "Protodetachable Arylsilane Polymer Linkages for Use in Solid Phase Organic Synthesis", *J. Am. Chem. Soc.*, vol. 117 (1995), pp. 11999–12000.

Boehm, T. et al., "Development of a Novel Silyl Ether Linker for Solid–Phase Organic Synthesis", *J. Org. Chem.*, vol. 61 (1996), pp. 6498–6499.

Maxson, K. et al., "Silicon–Containing Solid Support Linkers", ACS meeting, Aug. 25–29, 1996, 1 page.

Stranix, B. et al., "Functional Polymers fron (Vinyl)polystyrene. Recyclable Polymer–Supported Organosilicon Protecting Groups for Solid–Phase Synthesis", *J. Org. Chem.*, vol. 62, (1997), pp. 6183–6186.

Farrall, M. et al., "Bromination and Lithiation: Two Important Steps in the Functionalization of Polystyrene Resins", *J. Org. Chem.*, vol. 11, No. 21, (1976), pp. 3877–3882.

Plunkett, M. et al., "Silicon–Based Linker for Traceless Solid–Phase Synthesis", *J. Org. Chem.*, vol. 60, (1995), pp. 6006–6007.

Hu, Y. et al., "Novel Polymer–Supported Trialkylsilanes and Their Use in Solid–Phase Organic Synthesis", *J. Org. Chem.*, vol. 63, No. 13, (1998), pp. 4518–4521.

Newlander, K. et al., "Simple Silyl Linker for the Solid Phase Organic Synthesis of Aryl–Containing Molecules", *J. Org. Chem.*, vol. 62, (1997), pp. 6726–6732.

Woolard, F. et al., "A Silicon Linker for Direct Loading of Aromatic Compounds to Supports. Traceless Synthesis of Pyridine–Based Tricyclics", *J. Org. Chem.*, vol. 62, (1997), pp. 6102–6103.

Thompson, L. et al., "Synthesis and Applications of Small Molecule Libraries", *Chem. Rev.*, vol. 96, (1996), pp. 555–600.

*Primary Examiner*—Melvyn I. Marquis
*Attorney, Agent, or Firm*—David J. Weitz; Wilson Sonsini Goodrich & Rosati

[57] ABSTRACT

A modified solid support for use in solid phase synthesis which comprises:

a solid support having a linker group extending therefrom having the general formula:

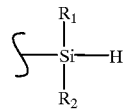

wherein $R_1$ and $R_2$ are each independently selected from the group consisting of alkyl, cycloalkyl, aryl, alkoxy, aryloxy, fluorine, chlorine, iodine and bromine.

23 Claims, 10 Drawing Sheets

R&R':

H-, $CH_3-$, $CH_3CH_2-$, $CH_3CH_2CH_2-$, $CH_3CH_2CH_2CH_2-$, $CH_3CH_2CH_2CH_2CH_2-$, $CH_3CH_2CH_2CH_2CH_2CH_2-$, $CH_3OCH_2-$, $CH_3SCH_2-$, etc.

etc.

R&R':

$CH_3-$, $CH_3CH_2-$, $CH_3CH_2CH_2CH_2-$, Cl, Br, F, I, $C_nH_{2n+1}-$ (n=5-23, straight and branched)

Y:

Cl, Br, I, $ClO_4$, RO, ArO, RS, RCOO, $CF_3COO$, $RSO_3$, $ArSO_3$, $CF_3SO_3$, $R_1R_2N$, CN, $NO_3$,

RCONR'R, R(R=alkyl, Ar=aryl).

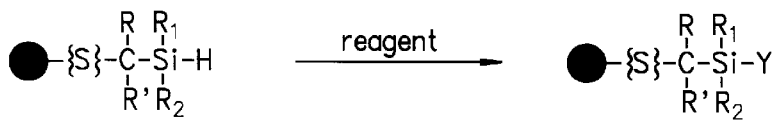

| Y | reagent | catalyst |
|---|---|---|
| Cl | trichloroisocyanuric acid | no |
| Cl | N-chlorosuccinimide | no |
| Cl | tritylchloride | no |
| Br | tritylbromide | no |
| Br | N-bromosuccinimide | no |
| I | N-iodosuccinimide | no |
| $ClO_4$ | $HClO_4$ | no |
| $ClO_4$ | trityl perchlorate | no |
| $RSO_3$ | $RSO_3H$ | no |
| $R_1R_2N$ | $R_1R_2NH$ | F, Rh or Pt catalyst |
| $NO_3$ | $HNO_3$ | no |
| imidazolate | imidazole | F, Rh or Pt catalyst |
| benzotriazolate | Hydroxybenzotriazole | F, Rh or Pt catalyst |
| $CF_3COO$ | $CF_3COOH$ | none, or F, Rh or Pt catalyst |
| $MeSO_3$ | $MeSO_3H$ | no |
| $CF_3SO_3$ | $CF_3SO_3H$ | no |
| $C_3F_3O$ | $C_3F_3OH$ | F, Rh or Pt catalyst |
| ArO (Ar= electron poor aromatic) | ArOH | F, Rh or Pt catalyst |

*FIG. 5*

COMPOSITIONS FOR ORGANIC SYNTHESIS ON SOLID PHASE AND METHODS OF USING THE SAME

FIELD OF THE INVENTION

The present invention relates to a modified solid support for use in organic synthesis and more particularly to modified solid supports which include novel-silane linker groups extending therefrom.

BACKGROUND OF THE INVENTION

Silyl-derivatives are widely used in synthetic organic chemistry to protect functional groups (e.g. alcohols, phenols, carboxylic acids, amines, acetylenes, and aromatic rings, etc.). See, for example, Greene et al. in *Protecting Groups in Organic Synthesis,* John Wiley and Sons, pp. 68 (1991) and Kocienski in *Protecting Groups,* Thieme, pp. 28 (1994). Silyl-derivatives are useful because they are inert to a wide range of synthetic organic chemistry conditions yet they can be removed (cleaved) under selective conditions (e.g. HF/pyridine, fluoride ion).

Linkers represent specialized forms of protecting groups used in solid-phase organic synthesis (SPOS). Linkers are solid-phase protecting groups, which allow attachment of a scaffold or template molecule to an insoluble support matrix. Attachment of the scaffold or template undergoing chemical modifications to an insoluble support provides a practical method to remove excess reagents and starting materials and spent reagents via extensive washing and filtration without loss of product. After suitable chemical modifications, the scaffold or template can be cleaved from the support matrix under selective conditions that will not alter the modified scaffold or template. Due to the explosion of interest and effort in combinatorial chemistry which utilizes SPOS, there is an increasing need for practical and selective linkers and reagents.

Polymeric silylating reagents have been used to attach alcohols on solid support. Farral; Frechet, J. Org. Chem., 41, 3877 (1976). Fyles; Leznoff, Can. J. Chem., 54, 935 (1976) used lithiation of the phenyl rings followed by trapping of aryl lithium intermediates with dialkyldichlorosilanes to prepare silylated resins. These types of silylated resins have been utilized for silyl ether based linkages by Chan; Huang, J. Chem. Soc., Chem. Commun., 909 (1995) and Randolph; McLure; Danishefsky, J. Am. Chem. Soc., 117, 5712 (1995). Maxson and Whitlock have also reported the preparation of arylsilane linkers and their use in cyclization reactions on solid-support (Maxson; Whitlock, "Silicon-Containing Solid Support Linker", poster #405 presented at the American Chemical Society, Division of Organic Chemistry, Orlando, Fla., Aug. 25–29, 1996.).

Diisopropylsilyloxy linkers bound to support through Si-O bonds have been developed to take advantage of the bulky isopropyl groups to stabilize the linkage. Routledge; Wallis; Ross; Fraser, Bioorg. Med. Chem. Lett., 5, 2059 (1995), prepared a silyl derivatized CPG (controlled pore glass) silica that utilized 3'-hydroxy group as the point of attachment to the support for solid-phase oligonucleotide synthesis. Boehm; Showalter, J. Org. Chem., 61, 6498 (1996) developed a diisopropylarylsilyloxy linker for the traceless attachment during the synthesis of benzofurans. These linkers proved to be stable to strong basic conditions.

Several recent reports have utilized dimethylarylsilane linkers bound to support through Si-$CH_2$ linkage with intervening heteroatoms in the spacer groups that allowed for the preparation of various substituted aromatic compound libraries by protodesilylation (ipso desilylation) or fluoride-mediated cleavage. One such application is in the synthesis of 1,4-benzodiazepine derivatives by Plunkett; Eliman, J. Org. Chem., 60, 6006 (1995). Similar dimethylarylsilane linkers containing intervening heteroatoms in the spacer chains have been reported by Chenera; Finkelstein; Veber, J. Am. Chem. Soc., 117, 11999 (1995), Han; Walker; Young, Tetrahedron Lett., 37, 2703 (1996), Chenera et. al. WO 95/16712, and Willems, Drug Discovery Today, 2, 214 (1997). A limitation in the aforementioned approaches is that scaffolds must first be attached to the silicon linker and then the linker is attached to the solid support. This requires a synthetic method for attaching the silicon linker to the scaffold to be developed for each scaffold.

Chenera and coworkers prepared silicon linkers of a resin-bound olefin with dimethylarylsilane derivatives via hydrosilylation (WO 98/17695). Similarly, Stranix et al (J. Org. Chem., 1997, 62, 6183–6186) prepared organosilicon protecting groups on (vinyl)polystyrene by hydrosilylation of a resin-bound olefin with dialkylchlorosilane derivatives. Woolard; Paetsch; Ellman (J. Org. Chem., 1997, 62, 6102–6103) recently reported a linkage strategy in which the arylsilyl group is attached to the support through an aliphatic tether. This arylsilyl linker can be activated by protodesilylation to provide a silyl chloride resin. Suspension polymerization of functional styrene monomers containing a pendant aryl silane was used for the preparation of silane resin which was then activated by protodesilylation [Stover; Lu,; Frechet, J. Polymer Bulletin, 25, 575–82 (1991)]. In the latter three cases, moisture sensitive silyl chlorides are necessary intermediates for loading of substrates.

Reactive and unstable silyl chlorides are commonly used in existing silicon-based linker approaches. Polymer-bound silyl-derivatives are typically produced by the reaction of silyl chlorides and the corresponding functionality. Polymer supported silyl chlorides have been reported by several workers. See Farral and Frechet (1976); Chang and Huang (1995); Randolph et al (1995); and Storer et al (1991).

Polymer supported silyl chlorides are beset by a number of limitations. For example, successful examples of silyl chlorides are largely restricted to silyl chlorides attached to polymer through an aromatic-silicon bond. Such polymer-bound silyl chlorides are prepared by aromatic ring lithiation and trapping with dialkyldichlorosilanes. These procedures are problematic due to potential cross-linking when highly activated, unhindered silanes are used (e.g., dimethyidichlorosilane); and the risk that the resulting resins are contaminated with lithium salts, which frequently cannot be extensively washed because washing promotes degradation of the Si-Cl moiety. Additionally, silyl chlorides leading to aromatic-silicon bonds have restricted utility due to their potential for competitive protodesilylation leading to undesirable cleavage of the linker.

Silyl chlorides have the further limitation of being reactive and unstable, making them poorly suited as commercial products. For example, reactions with moisture lead to hydrolysis of the silyl chloride to form a silanol (Si-OH). The silyl chloride's instability leads to poor shelf life. A further limitation associated with the use of polymer supported silyl chlorides is the difficulty associated with monitoring Si-Cl displacements using standard spectroscopic techniques.

A need thus currently exists for improved silicon-based linkers which overcome the disadvantages described above with regard to existing silicon-based linker technology.

SUMMARY OF THE INVENTION

A modified solid support is provided for use in solid phase synthesis which comprises:

a solid support having a linker group extending therefrom having the general formula:

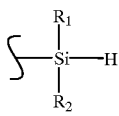

wherein $R_1$ and $R_2$ are each independently selected from the group consisting of alkyl, cycloalkyl, aryl, alkoxy, aryloxy, fluorine, chlorine, iodine and bromine.

In one embodiment, the modified solid support comprises:

a solid support having a linker group extending therefrom having the general formula:

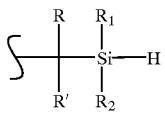

wherein

R and R' are each independently selected from the group consisting of hydrogen, alkyl, cycloalkyl, and aryl; and $R_1$ and $R_2$ are each independently selected from the group consisting of alkyl, cycloalkyl, aryl, alkoxy, aryloxy, fluorine, chlorine, iodine and bromine.

In another embodiment, the modified solid support comprises:

a solid support having a linker group extending therefrom having the general formula:

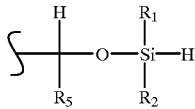

wherein $R_1$ and $R_2$ are each independently selected from the group consisting of alkyl, cycloalkyl, aryl, alkoxy, aryloxy, fluorine, chlorine, iodine and bromine; and $R_5$ is selected from the group consisting of hydrogen, alkyl, cycloalkyl, and aryl.

In yet another embodiment, the modified solid support comprises:

a solid support having a linker group extending therefrom having the general formula:

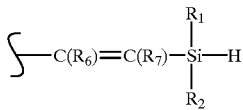

wherein $R_1$ and $R_2$ are each independently selected from the group consisting of alkyl, cycloalkyl, aryl, alkoxy, aryloxy, fluorine, chlorine, iodine and bromine; and $R_6$ and $R_7$ are each independently selected from the group consisting of hydrogen, alkyl, cycloalkyl, and aryl.

In yet another embodiment, the modified solid support comprises:

a solid support having a linker group extending therefrom having the general formula:

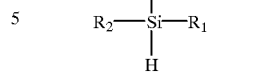

wherein $R_1$ and $R_2$ are each independently selected from the group consisting of alkyl, cycloalkyl, aryl, alkoxy, aryloxy, fluorine, chlorine, iodine and bromine; and $R_8$ and $R_9$ are each independently selected from the group consisting of hydrogen, alkyl, cycloalkyl, and aryl.

In yet another embodiment, the modified solid support comprises:

a solid support having a linker group extending therefrom having the general formula:

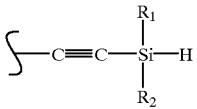

wherein $R_1$ and $R_2$ are each independently selected from the group consisting of alkyl, cycloalkyl, aryl, alkoxy, aryloxy, fluorine, chlorine, iodine and bromine.

The above linker groups have the advantage of addressing many of the limitations of the silyl chloride linker groups described above. In particular, the silicon linker of the present invention can be attached to a solid support and provide a generic product that can be used to attach a large variety of scaffolds. This versatility of the silicon linker significantly increases its commercial value. A further advantage of the silane functionality (Si-H) of the linker is its ability to be readily monitored by the loss of absorption of the Si-H stretch at 2200–2000 $cm^{-1}$ in the infrared (IR) spectrum.

Also proved are several methods for synthesizing these silicon-containing linker compounds, as well as methods for attaching substituents onto these silicon-containing linker compounds.

For example, a method is provided for synthesizing a modified solid support for use in solid phase synthesis. In one embodiment, the method comprises the steps of:

taking a solid support having an alkene extending therefrom; and performing a hydrosilylation reaction on the alkene with a silane having the general formula:

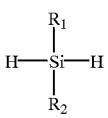

wherein $R_1$ and $R_2$ are each independently selected from the group consisting of alkyl, aryl, alkoxy, aryloxy, fluorine, chlorine, iodine and bromine. According to this method, the alkene may have a terminal carbon substituted by R and R' which are each independently selected from the group consisting of hydrogen, alkyl, cycloalkyl, and aryl.

In another embodiment, the method comprises the steps of:

taking a solid support having an alkene extending therefrom whose terminal carbon have substituents R and R' which are each independently selected from the group consisting of hydrogen, alkyl, cycloalkyl, and aryl;

performing a hydrosilylation reaction on the alkene to form a compound having the general formula:

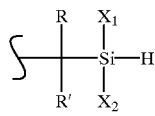

wherein $X_1$ is selected from the group consisting of alkyl, cycloalkyl, aryl, fluorine, chlorine, iodine and bromine and $X_2$ is selected from the group consisting of fluorine, chlorine, iodine and bromine; and reacting the compound with an alkyl, aryl, alkoxy, or aryloxy metal reagent where the reagent is selected such that a silane is formed having the general formula:

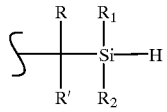

where $R_1$ and $R_2$ are each independently selected from the group consisting of alkyl, cycloalkyl, aryl, alkoxy, and aryloxy.

In yet another embodiment, the method comprises the steps of taking a silane having the general formula:

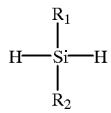

wherein $R_1$ and $R_2$ are each independently selected from the group consisting of alkyl, aryl, alkoxy, aryloxy, fluorine, chlorine, iodine and bromine; and reacting the silane with a solid support having an aldehyde or ketone extending therefrom with a regent to form a modified solid support having the general structure

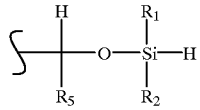

wherein $R_5$ is selected from the group consisting of hydrogen, alkyl, cycloalkyl, and aryl.

In yet another embodiment, the method comprises the steps of:

taking a silane having the general formula:

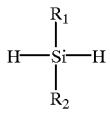

wherein $R_1$ and $R_2$ are each independently selected from the group consisting of alkyl, aryl, alkoxy, aryloxy, fluorine, chlorine, iodine and bromine; and reacting the silane with a solid support having an alkyne extending therefrom to form a modified solid support having the general structure

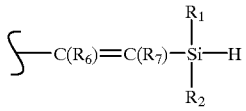

and/or

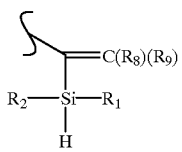

wherein $R_6$, $R_7$, $R_8$, and $R_9$ are each independently selected from the group consisting of hydrogen, alkyl, cycloalkyl, and aryl.

A method is also provided for synthesizing a modified solid support for use in solid phase synthesis having the general structure

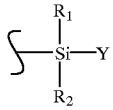

wherein $R_1$ and $R_2$ are each independently selected from the group consisting of alkyl, aryl, cycloalkyl, alkoxy, and aryloxy; and Y is an activated group for nucleophilic substitution.

According to this method, examples of Y groups include but are not limited to chlorine, bromine, iodine, perchlorate, alkylsulfonate, perfluoroalkyl sufonate, arylsulfonate, nitrate, acetamide, cyanide, trifluoromethanesulfonate and benzotriazolate.

The method comprises the steps of:

taking a solid support having a linker group extending therefrom having the general formula:

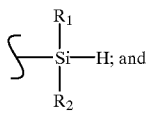

reacting the linker group with a reagent to form a modified linker group having the general formula:

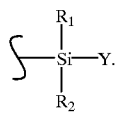

It is noted that the solid supports reacted and formed according to this method may include the solid supports shown in the table below. In the table below, each of the substituent labels are used consistently with their usage above.

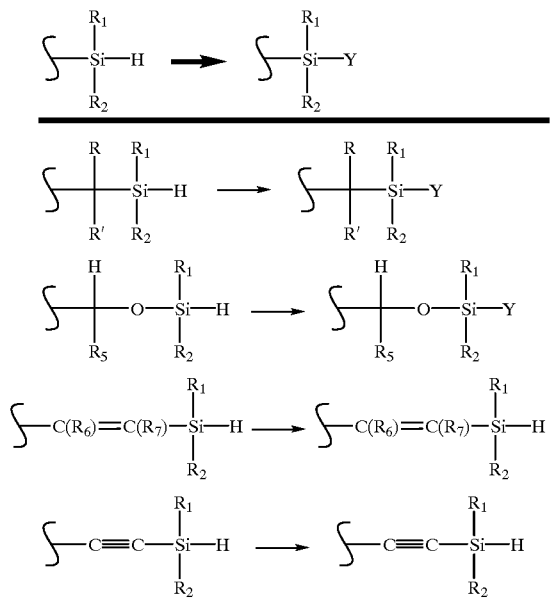

A method is also provided for synthesizing a modified solid support for use in solid phase synthesis having the general structure

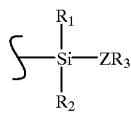

wherein $R_1$ and $R_2$ are each independently selected from the group consisting of alkyl, aryl, cycloalkyl, alkoxy, and aryloxy; and Z is selected from the group consisting of sulphur and oxygen and $R_3$ is selected from the group consisting of alkyl, cycloalkyl, and aryl. According to this embodiment, examples of $ZR_3$ groups include but are not limited to alkoxy, aryloxy, thiolate, and carboxylate.

The method comprises the steps of:

taking a solid support having a linker group extending therefrom having the general formula:

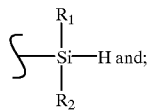

reacting the linker group with a reagent to form a modified linker group having the general formula:

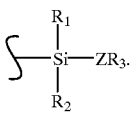

It is noted that the solid supports reacted and formed according to this method may include the solid supports shown in the table below. In the table below, each of the substituent labels are used consistently with their usage above.

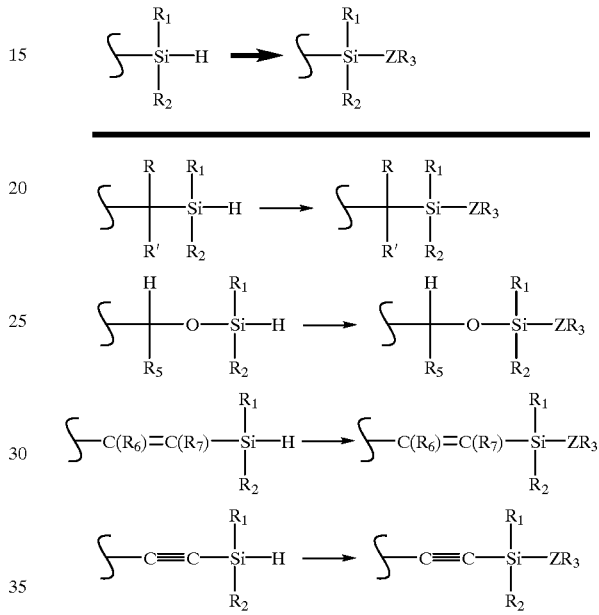

A method also provided for synthesizing a modified solid support for use in solid phase synthesis having the general structure

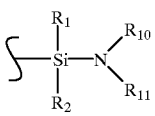

wherein $R_1$ and $R_2$ are each independently selected from the group consisting of alkyl, aryl, cycloalkyl, alkoxy, and aryloxy; and $R_{10}$ and $R_{11}$ are each independently selected to form a primary, secondary and tertiary amine.

In one embodiment, $R_{10}$ and $R_{11}$ are each independently selected from the group consisting of hydrogen, alkyl, cycloalkyl, and aryl.

The method comprises the steps of:

taking a solid support having a linker group extending therefrom having the general formula:

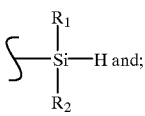

reacting the linker group with a reagent to form a modified linker group having the general formula:

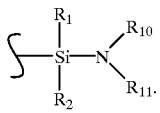

It is noted that the solid supports reacted and formed according to this method may include the solid supports shown in the table below. In the table below, each of the substituent labels are used consistently with their usage above.

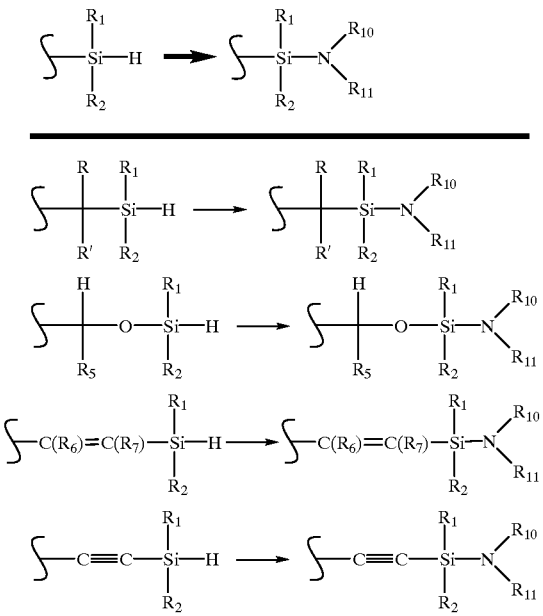

A method is also provided for synthesizing a modified solid support for use in solid phase synthesis having the general structure

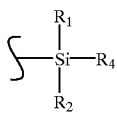

wherein $R_1$ and $R_2$ are each independently selected from the group consisting of alkyl, cycloalkyl, aryl, alkoxy, and aryloxy, and $R_4$ is selected from the group consisting of an alkane, alkene, alkyne, and aryl.

In one embodiment, the method comprises the steps of:

taking a solid support having a linker group extending therefrom having the general formula

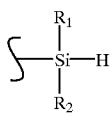

;and reacting the linker group with a reagent or catalyst to form a modified linker group having the general formula:

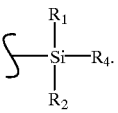

It is noted that the solid supports reacted and formed according to this method may include the solid supports shown in the table below. In the table below, each of the substituent labels are used consistently with their usage above.

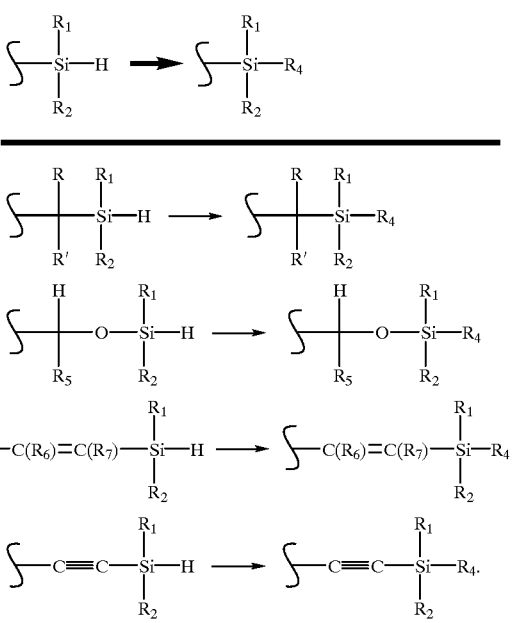

In another embodiment, the method comprises the steps of:

taking a solid support having a linker group extending therefrom having the general formula:

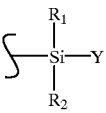

reacting the linker group with a reagent to form a modified linker group having the general formula:

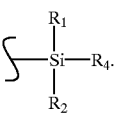

In this embodiment, Y may be bromine, iodine, perorate, alkylsulfonate, arylsulfonate, nitrate, acetamide, cyanide, and benzotriazolate.

It is noted that the solid supports reacted and formed according to this method may include the solid supports shown in the table below. In the table below, each of the substituent labels are used consistently with their usage above.

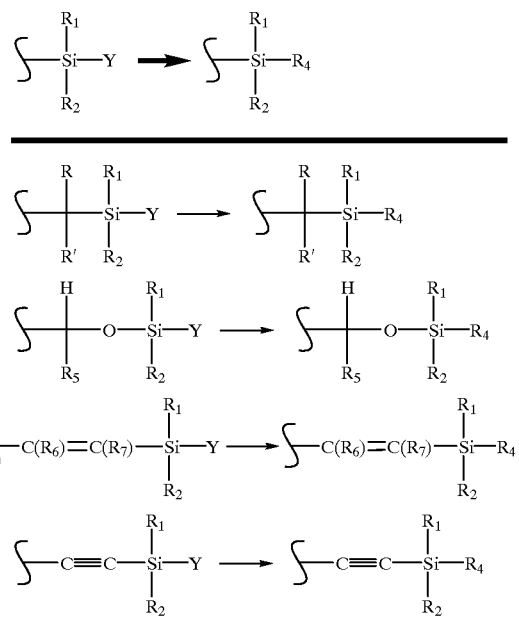

BRIEF DESCRIPTION OF THE DRAWINGS

FIG. 5 illustrates how silanes prepared with the general formula (P)—(S)—CRR'—$SiR_1R_2H$ (where P is the solid support and S is the spacer) can be further activated to give (P)—(S)—CRR'—$SiR_{13}R_2Y$ wherein Y is an activated leaving group for nucleophilic substitution.

DETAILED DESCRIPTION OF THE INVENTION

Definitions

Figure 1:
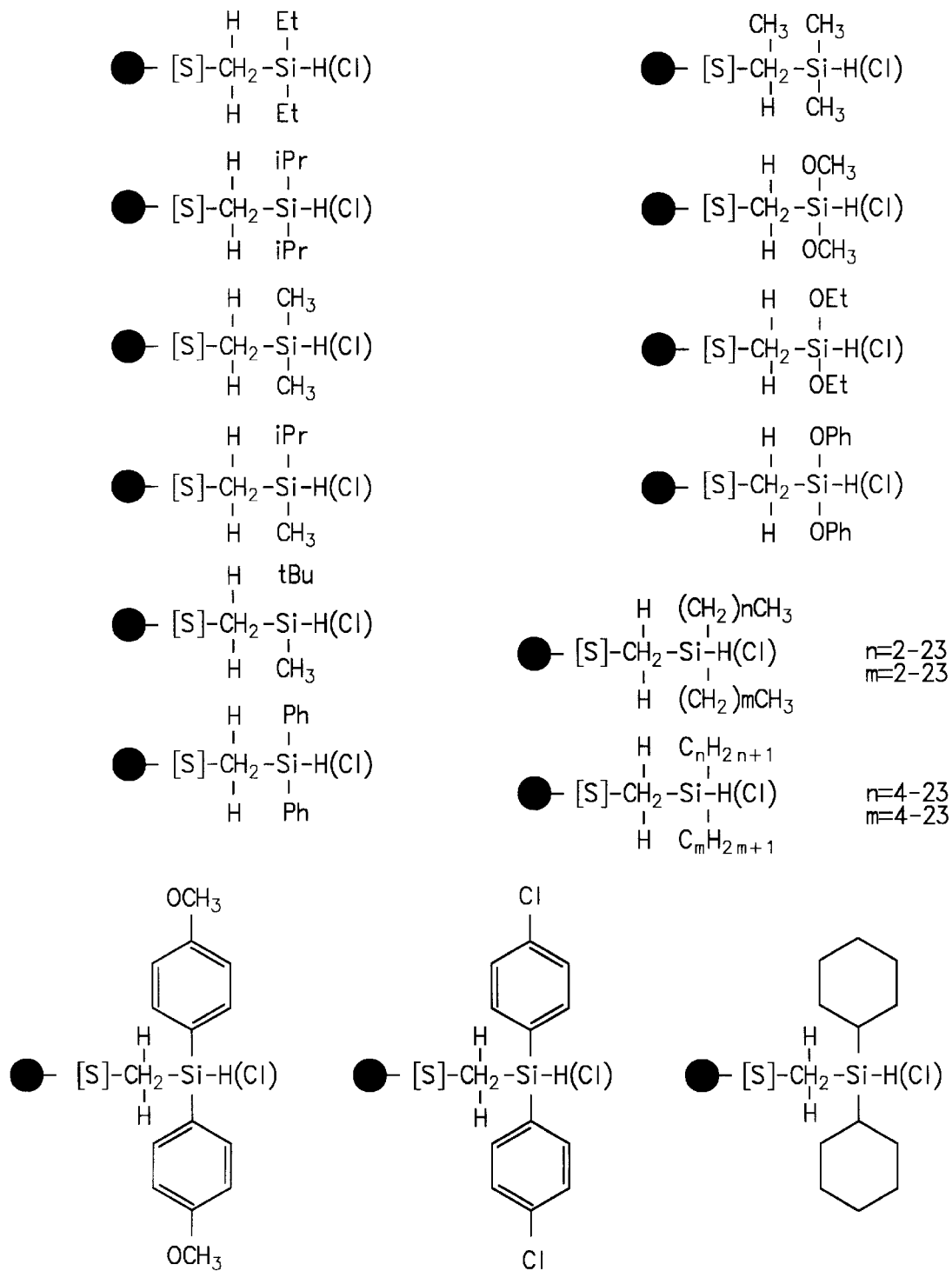
FIG. 1 illustrates examples of representative linker groups according to the present invention.

Unless otherwise defined, all technical and scientific terms employed herein have their conventional meaning in the art. As used herein, the following terms have the meaning ascribed to them.

"Solid supports" refers to solid particles of any size and shape which are substantially insoluble in aqueous solvents and organic solvents at the temperatures and other conditions typically employed in solid phase synthesis reactions.

"Substantially insoluble" means that less than 20 percent of 1 g of the specified solid support will solubilize in 1000 g of the specified solvent at 40° C. and at atmospheric pressure.

As used in this application, the terms alkyl, cycloalkyl, and aryl refer to substituents having a straight chained or branched alkyl, a cycloalkyl or cyclic aromatic carbon backbone which may be optionally substituted with substituents having heteroatoms.

As used in this application, the terms alkyl metal reagents and aryl metal reagents refer to reagents such as Grignard reagents, lithium alkyl and aryl reagents and the like which include an alkyl or aryl substituent complexed to a cationic metal such as lithium, sodium, potassium, magnesium, aluminum and zinc.

Solid Supports

Solid supports (P) used in the present invention include particles conventionally employed as solid phase supports or solid supports in solid phase synthesis. To employ the present invention requires a method to link the solid support to the spacer group. Although in many cases direct reaction between an appropriate spacer group and the solid support is possible, most often linking is achieved by reaction between a reactive functional group on the solid support with the spacer group. The reactive functionality serves as a handle to link the solid support to the spacer group. Alternatively, the reactive functionality can be used to link directly to the —Si $R_1R_2H$, group when the spacer group is null. For the purposes of this disclosure, "linking to the spacer group" includes all cases.

Solid supports are typically functionalized with one or more functional groups. That is, the supports have one or more functional groups usually covalently linked thereto. The functional groups may be incorporated into the matrix that forms the particle, such as the polymer matrix, or may be covalently attached to the surface of the support. The functional groups provide a reactive site for attachment of the spacer group. Several solid phase particles having functional groups covalently linked thereto have been described in the chemical and biochemical literature. See E. Atherton and R. C. Sheppard, "Solid Phase Synthesis: A Practical Approach" Oxford University Press, 1989, and E. C. Blossey, "Solid Phase Synthesis," Dowden Hutchinson & Ross Publishers.

The compositions of the present invention may include any of the many different known types of solid supports and is not limited by the nature of the functional group(s) linked to the particles. The only requirement is that the solid phase support must be substantially insoluble in aqueous and organic solvents and be substantially inert to the reaction conditions needed to employ the solid support in chemical synthesis. The solid supports typically fall into one of four types: (1) organic polymer resins; (2) silica based; (3) composites; and (4) surface-grafted objects. Each of these types of solid supports are described below. It is noted that the invention is not intended to be limited to these four types.

One type of solid phase support includes organic polymer resins which are commonly used for the synthesis of polypeptides, oligopeptides, oligonucleotides, and organic small molecules. These solid supports comprise polymerized resins having functional groups attached thereto (i.e., "functionalized resins"). One example of a functionalized resin is hydrophobic polymerized styrene crosslinked with divinyl benzene (typically at about 0.5 to 2 weight percent).

The polymerized resin is typically provided in the form of a bead, which is further reacted to provide a known quantity of substituted benzyl moieties attached to the polymerized resin. The substituted benzyl moieties typically contain a reactive functional group through which the spacer group is covalently linked. The reactive substituted benzyl moieties are typically added to the particle after the resin bead has been prepared. These supports are generally characterized as crosslinked poly-(styrene divinyl benzene) resins that include a known quantity of disubstituted benzene cross-links.

The functional groups of the substituted benzyl moieties may be amino groups, halogens (such as chlorobenzyl moieties), hydroxy groups, thiol groups or combinations of any two or more of the above.

Polymerized, crosslinked styrene-divinyl benzene resins containing chlorobenzyl moieties are sometimes referred to in the art as "chloromethyl styrene resins," while resins containing aminobenzyl moieties are sometimes referred to as "amino-styrene" or "aminomethyl-styrene resins."

Chloromethyl styrene resins are available from a number of vendors, including Novabiochem, Advanced Chemtech (Louisville, Ky.), and Argonaut Technologies. These materials typically contain from 0.1 to 2 milliequivalents of chlorine per gram of particle.

Resinous particles having aminobenzyl moieties may be prepared from polymerized styrene cross-linked with divinyl benzene by reaction with N-(hydroxymethyl) phthalimide under Friedel-Crafts conditions followed by hydrazinolysis of the phthalimide group as described by A. R. Mitchell, S. B. H. Kent, M. Engelhard, R. B. Merrifield J.Org Chem, 1978, 43, 2845–2852. Particles containing aminobenzyl moieties are available from a number of vendors, including Novabiochem, Advanced Chemtech (Louisville, Ky.), and Argonaut Technologies. Typically, the particles contain from about 0.1 to about 1.5 millimoles of aminobenzyl moiety per gram of particles.

Other functionalized polystyrenes that may be employed in the compositions of the present invention include but are not limited to polymerized polystyrene having carboxyl functional groups (i.e., carboxypolystyrene), polymerized polystyrene having hydroxymethyl functional groups (i.e., hydroxymethyl polystyrene), polymerized polystyrene having formyl functional groups (i.e., formyl polystyrene), polymerized polystyrene having sulfonyl functional groups (i.e., sulfonyl polystyrene), and polystyrene having bromomethyl functional groups (i.e., bromomethyl polystyrene).

In addition, grafted polystyrene resin solid supports which may be employed in the compositions of the present invention include the ARGOGEL™ resins which are commercially available from Argonaut Technologies Inc. of San Carlos, Calif. and the TENTAGEL™ resins which are commercially available from Rapp Polymere of Tubingen, Federal Republic of Germany. Generally, these resins are poly(ethyleneoxide)-grafted polystyrene resin particles having functional groups which include alcohol group, alkyl amine groups, alkyl halide groups, alkyl thiol groups, or combinations thereof.

A second type of solid supports include silica-containing particles such as porous glass beads and silica gel. Examples of these supports are described in A. Guyot, A. Revillon, E. Carlier, D. Leroux, C. Le Deore Makromol. Chem. Macromol Symp., 1993, 70/71, 265–74.

A third type of solid support includes composites of a resin and another material, both of which are substantially inert to the organic synthesis conditions. The second material may be a resin as well. One representative example of a composite material is reported in Scott et al., J Chrom. Sci., 9, 577–591 (1971). Essentially, this composite support includes glass particles coated with a hydrophobic, polymerized, crosslinked styrene containing a reactive chloromethyl group and is commercially available from Northgate Laboratories of Hamden, Conn.

In addition, grafted polyethylene, polypropylene, polytetrafluoroethylene supports may be employed in the compositions of the present invention. These supports are often surface-grafted objects which are larger than resin beads, and include SYNPHASE™ Crowns (Chiron Technologies, Melbourne, Australia) and Irori MICROTUBES™ (Irori, La Jolla, Calif.). Generally these supports are comprised of polystyrene, polyacrylamide or polyacrylic acid grafts onto polystyrene or polypropylene cores, which have functional groups along the backbone, including amine, alcohol and other linkers.

The solid supports useful in the compositions and methods of the present invention are substantially insoluble in both organic and aqueous solvents. Selection of organic solvent is described below. Generally, less than 20 percent of 1 g of the support will solubilize in 1000 g of an aqueous or organic solvent at 40° C. and atmospheric pressure. More typically, less than 15 percent of 1 g of the support will solubilize in 1000 g of aqueous or organic solvent at 40° C. and atmospheric pressure. Preferably, less than 10 percent of 1 g of the support will solubilize in 1000 g of aqueous or organic solvent at 40° C. and atmospheric pressure.

An important aspect of the present invention is that the solid support is substantially insoluble in the organic solvents with which it will be used. Organic solvents suitable for the present invention include, but are not limited to the ones listed in the table below.

Examples Of Organic Solvents For Use With Solid Supports

Alcohols:
methanol, ethanol, isopropanol, n-propanol, n-butanol, iso-butanol, amyl alcohol, hexafluoroisopropyl alcohol, benzyl alcohol, phenol, diethylene glycol, propylene glycol Ketones
acetone, methyl ethyl ketone, methyl isopropyl ketone, methyl isobutyl ketone, cyclohexanone Halocarbons
dichloromethane, chloroform, trichloroethylene, tetrachloroethylene, [1,1,1]-trichloroethane, trichlorotrifluorethane, carbon tetrachloride), hydrocarbons (pentane, hexane, heptane, octane)

Aromatic hydrocarbons
benzene, toluene, xylene, m-cresol, chlorobenzene, trifluoromethyl benzene), amides (dimethyl formamide, dimethyl acetamide, N-methylpyrrolidinone), sulfoxides/sulfones (dimethyl sulfoxides, dimethyl sulfone, sulfolane)

Nitriles
acetonitrile, ethyl nitrile ethers (tetrahydrofuran, diethyl ether, [1,4]-dioxane)

Organic acids
acetic acid, formic acid

Amines
pyridine, aniline, triethanolamine

Esters
butyl acetate, ethyl acetate, trimethyl phosphate

Nitro compounds nitromethane, nitrobenzene

Preferred solvents include but are not limited to the following: isopropyl alcohol, ethanol, methanol, phenol, hexafluoroisopropyl alcohol, pentane, hexane, heptane, benzene, toluene, xylene, m-cresol, dimethyl formamide, dimethyl acetamide, N-methylpyrrolidinone, dimethyl sulfoxide, acetonitrile, dichloromethane, methyl ethyl ketone, cyclohexanone, acetone, dichloromethane, chloroform, trichloroethylene, and tetrahydrofuran.

Most preferably, the organic solvent is selected from the group consisting of toluene, dimethyl formamide, N-methylpyrrolidinone, dimethyl sulfoxide, acetonitrile, dichloromethane, and tetrahydrofuran.

Selection of Spacer Group

The spacer group (S) provides the connection between the solid support and the silicon-linker. The spacer functions to tether the silicon-linker away from the solid support, thereby minimizing the effect of the neighboring solid support on the chemical reactivity of the silicon linker. The spacer group may consist of a chain of atoms between 1 to 1,000 atoms in total. In some instances, it is desirable for no spacer group to be employed. When employed, the spacer group typically consists of an alkyl, cycloalkyl or aryl grouping of atoms. This grouping may contain branching and or may contain heteroatoms. The spacer group may also consist of a combination of alkyl, cycloalkyl, and aryl.

In one embodiment, spacer groups are employed which include linear alkyl chains of containing between 1 and 20 atoms. These alkyl chains may optionally include heteroatoms (e.g., oxygen, sulfur or nitrogen) in its backbone. A wide variety of substituents may also be attached to the backbone.

The spacer groups preferably have one or more of the following features: (1) contain a carbon at the beta- and gamma-position relative to the silicon; and (2) exhibit no branching at the beta-position relative to the silicon. Specific examples of preferred spacers include —$(CH_2)_n$— where n is between 1 and 20. It is noted, however, that the present invention is not intended to be limited to the particular spacer indicated but rather can employ any spacer which is found to be suitable for attaching a linker group according to the present invention to a solid support.

Substituents on Silane Linker Group

R and R'

Figure 2:
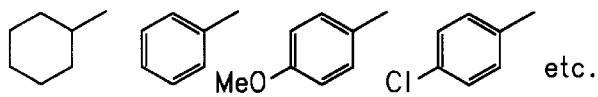
FIG. 2 illustrates examples of R and R' substituents which may be used in the compositions of the present invention.

R and R' may be alkyl, cycloalkyl, aryl, alkoxy, and aryloxy. These substituents may optionally also include heteroatoms in the substituents. FIG. 2 illustrates a series of examples of R and R' groups which may be used in the compositions of the present invention. It is noted, however, that the present invention is not intended to be limited to the particular R and R' substituents indicated in the figure. R and R' are preferably each independently a linear alkyl containing between 1 and 6 atoms or hydrogen.

Figure 3:
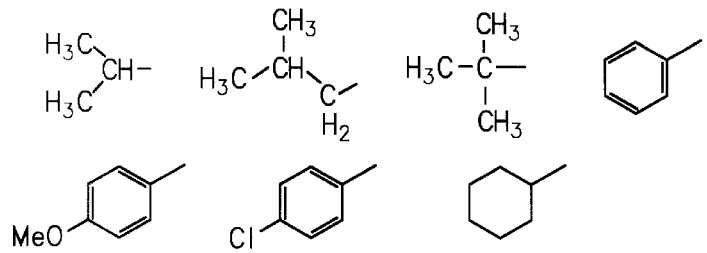
FIG. 3 illustrates examples of $R_1$ and $R_2$ substituents which may be used in the compositions of the present invention.

$R_1$ and $R_2$ $R_1$ and $R_2$ may be alkoxy ethers, halogens including fluorine, chlorine, bromine, and iodine, alkyl, cycloalkyl, and aryl. $R_1$ and $R_2$ may also contain heteroatoms in substituents on the alkyl, cycloalkyl and cycloalkyl $R_1$ and $R_2$ groups. FIG. 3 illustrates examples of $R_1$ and $R_2$ groups which may be used in the compositions of the present invention. It is noted, however, that the present invention is not intended to be limited to the particular $R_1$ and $R_2$ substituents indicated in the figure.

$R_1$ and $R_2$ are preferably linear or branched simple alkyls and arylalkyls containing between 1 and 24 atoms. $R_1$ and $R_2$ may contain heteroatoms. $R_1$ and $R_2$ are most preferably each independently a simple linear alkyls containing between 1 and 6 carbon atoms or phenyl. Especially preferred $R_1$ and $R_2$ substituents are methyl, ethyl, isopropyl, n-butyl, sec-butyl, t-butyl, and phenyl. Another preferred selection for $R_1$ and $R_2$ is chlorine.

Processes for Making And Using Linker Groups Of The Present Invention

Figure 4A:
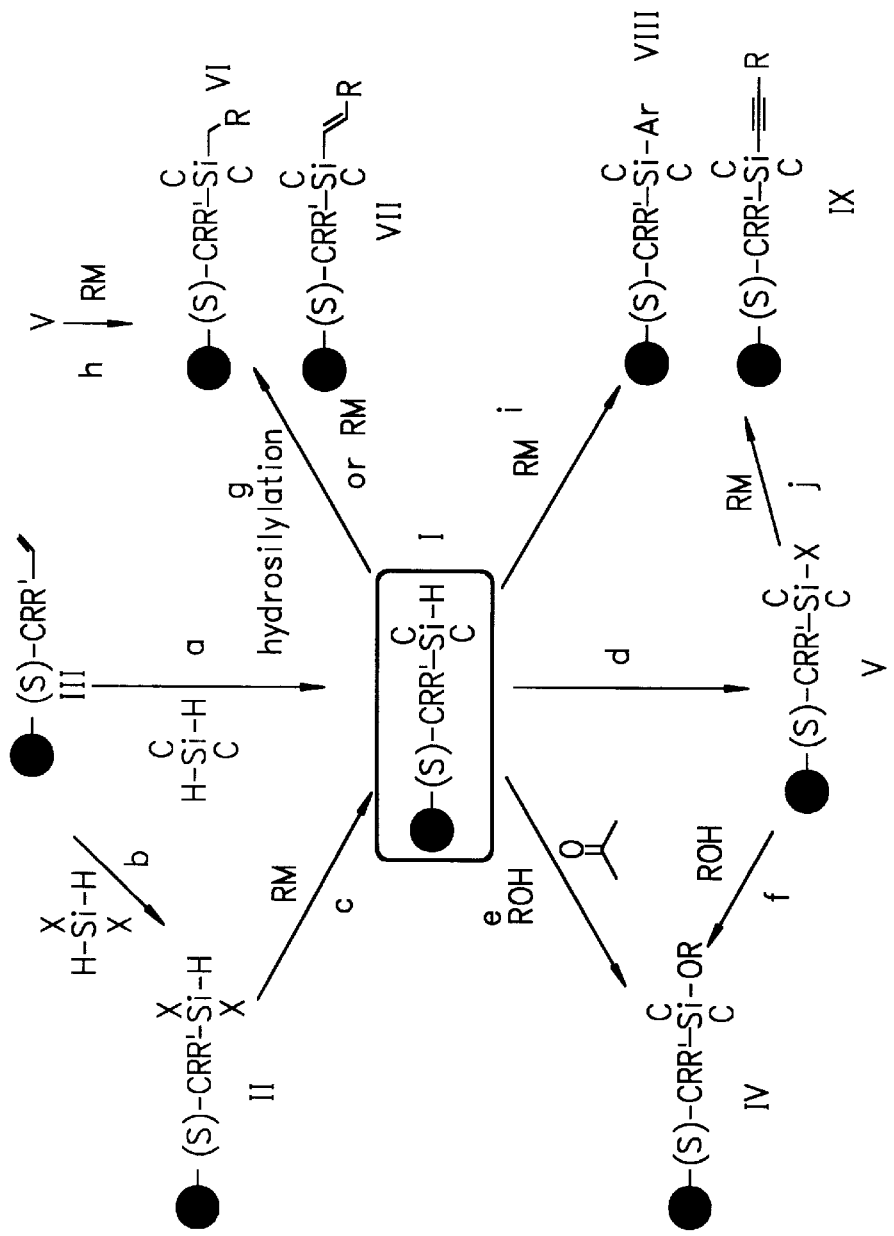
FIGS. 4A and 4B illustrate different reaction schemes for synthesizing and using linker groups according to the present invention.
Figure 4B:
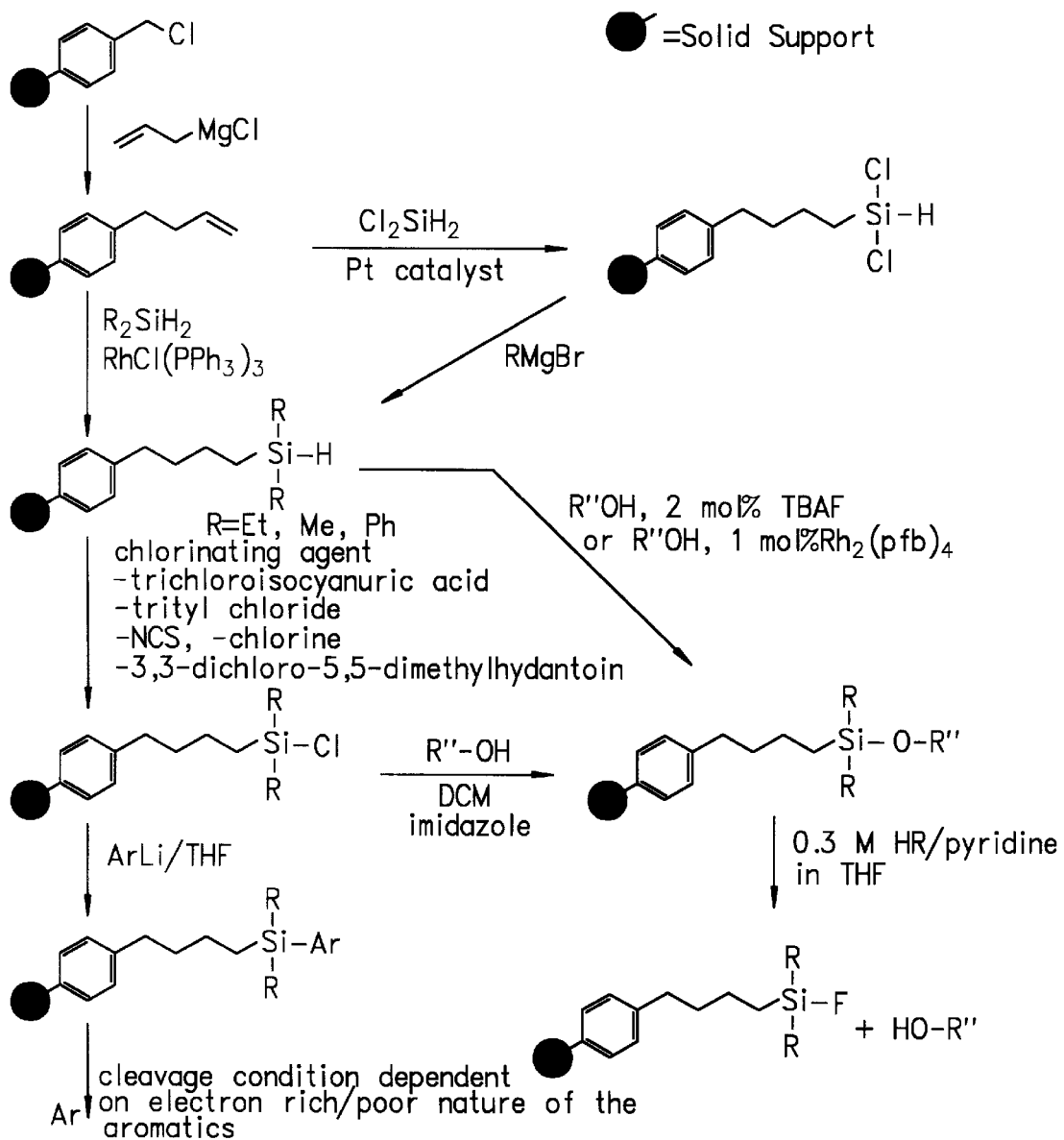

FIGS. 4A and 4B illustrate different reaction schemes for synthesizing and using linker groups according to the present invention. Additional reaction schemes are described below.

Hydrosilylation

There is provided by the present invention, a hydrosilylation method comprising effecting reaction between an olefinically unsaturated polymeric material and a disubstituted silane, in the presence of an effective amount of catalyst.

The resin bound olefins used for the preparation of silane resins in this invention adopted the general formula (P)—(S)—CR=$CH_2$ (where R is hydrocarbon, S is a spacer group, and P is the solid support resin). Representative resin bound olefins are below shown in Scheme 1: Compound (I) was previously synthesized by Kaeriyama; Shimura, *Makromol. Chem.*, 180, 2499 (1979). Compounds (II) and (III) were prepared by Tomoi; Shiiki; Kakiuchi, *Makromol. Chem.*, 187, 357 (1986). Compound (IV) was prepared by treating ArgoPore chloride (commercially available from Argonaut Technologies, Inc.) with allylmagnesium chloride. Compound (VI) was prepared by treating ArgoGel-OH (commercially from Argonaut Technologies) with potassium t-butoxide followed by alkylation with allyl bromide.

Scheme 1
Representative polymer-supported olefinic resins

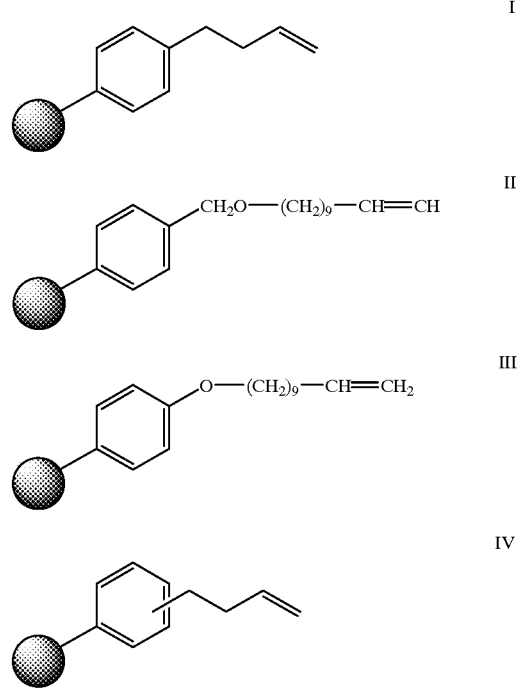

-continued

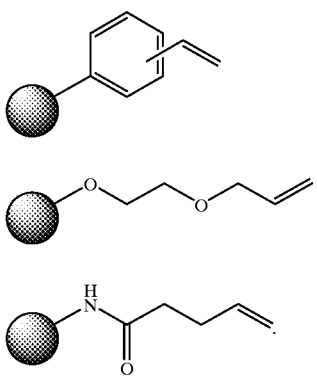

Suitable organosilicon compounds with Si-H groups for hydrosilylation in this invention are $H_2SiR_1R_2$, $H_3SiR$, [$R_1$, $R_2$, $R_3$ are independently halogen, $C_1$ to $C_{20}$ alkyl (R-). Preferred silanes used herein are $Et_2SiH_2$, $Cl_2SiH_2$, $Me_2SiH_2$, $iPr_2SiH_2$, $tBuMeSiH_2$, and $Ph_2SiH_2$.

All the known catalysts can be used for the hydrosilylation reaction between an olefinically unsaturated polymeric material and a silicon hydride in this invention. Specific examples thereof are: $H_2PtCl_6.6H_2O$, $Pt(CH_2=CH_2)_2$, $Pt(PhCN)_2Cl_2$, $(PPh_3)_2Pt(CH_2=CH_2)_2Cl_2$, $Pt\{[Me(CH_2=CH)SiO]_4\}_m$, $Pt(PBu_3)_4$, $Pt(PPh_3)_4$, $PtCl_2(NH_3)_2$, $Pt_n[(CH_2=CH)Me_2SiOSiMe_2(CH=CH_2)]_m$, $Pt[P(OPh_3)]_4$, $Pt[P(OBu)_3]_4$, $RhCl(PPh_3)_3$, $RhCl_3$, $RuCl_3$, $PdCl_2.2H_2O$, etc.

Preferred catalysts are those that exhibit desirable catalytic activity (high turnover and more complete reaction) in solvents known to swell the unsaturated polymeric matrix on which they act. Such solvents include dichloromethane, DMF, tetrahydrofuran, and toluene. A particularly preferred catalyst is $RhCl(PPh_3)_3$ ("Wilkinson's catalyst").

Addition to Silyl Halide By An Alkyl. Acetylenyl Or Aryl Metal Reagent

The silane derivatives with the general formula (P)—(S)—CRR'—SiX$_2$H (X=Cl, Br, etc.) can be further transformed by reaction with R"M (alkyl, alkynyl, acetylenyl or aryl metal reagent) to give (P)—(S)—CRR'—SiR$^1$R$^2$H wherein R$^1$, R$^2$ are both $C_1$ to $C_{20}$ alkyl, or aryl group. For example, the following reagents RM can be used: MeMgBr, MeLi, EtMgBr, iPrMgCl, iPrLi, PhMgBr, PhLi, etc. For illustrative solution phase examples, see Weidenbruch; Peter, J. Organomet. Chem., 84, 151(1975), who reacted isopropyl lithium with dichlorosilanes to give diisopropylsilanes. Shirahata, U.S. Pat. No. 5,153,343 (1992), used isopropylmagnesium chloride for this type of transformation in solution.

Processes for Using Silanes of Present Invention

Figure 6:
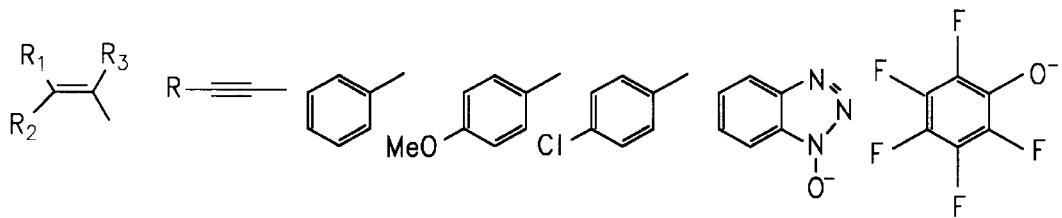
FIG. 6 illustrates examples of Y substituents which may be used in the compositions of the present invention.

As illustrated in FIG. 5, silanes of the present invention can be further activated by transformation into an activated leaving group for nucleophilic substitution (Y) such as halogens (chlorine, iodine, bromine), perchlorate ($ClO_4^-$), alkyl or aryl sulfonate ($RSO_3^-$), $RSO_2^-$, amino (RR'N$^-$) (R, R' are independently alkyl, or aryl), nitrate ($NO_3^-$), acetamide, benzotriazolate (OBT$^-$), or other suitable substituent. Examples of suitable Y groups include but are not limited to Y groups such as those illustrated in FIG. 6.

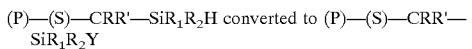

The following activating methods are suitable for performing the above transformation (references for the solution phase examples are listed in brackets). A method may be used which comprises the halogenation of Si-H to Si-X (X=halogen) in a resin having the Si-H group by treating the resin with a halogenating agent such as trityl chloride, trityl bromide, triphenylcarbonium bromoborate, [Corey; est, J. Am. Chem. Soc., 85, 2430 (1962)], N-chlorosuccinimide, N-bromosuccinimide, N-iodosuccinimide, $CuCl_2$ [ishikawa; Atsutaka; Yamamoto, U.S. Pat. No. 5,258,535 (1993)], trichloroisocyanuric acid, $Cl_2$, $Br_2$, or $I_2$. A method may also be used which comprises reacting a polymeric resin having the Si-H group with HX with the evolution of $H_2$ (with or without catalyst) wherein X is halogen [Shirahata, U.S. Pat. No. 5,312,949 (1994)], perchlorate ($ClO_4^-$), alkylsulfonate ($RSO_3^-$), $RSO_2^-$, amino (RR'N$^-$) (R, R' are independently alkyl, or aryl) [Yamamoto; U.S. Pat. No. 5,047,526 (1991)], nitrate ($NO_3^-$), benzotriazolate (OBT$^-$), etc. The catalyst used herein may be transition metal-based (e.g. Rh, Pt, or Pd catalyst) or nucleophilic (e.g. fluoride). A method may also be used which comprises reacting a polymeric resin having the Si-H group with trityl perchlorate or halide [cf. Barton; Tully, J. Org. Chem., 43, 3649 (1978).].

Figure 7A:
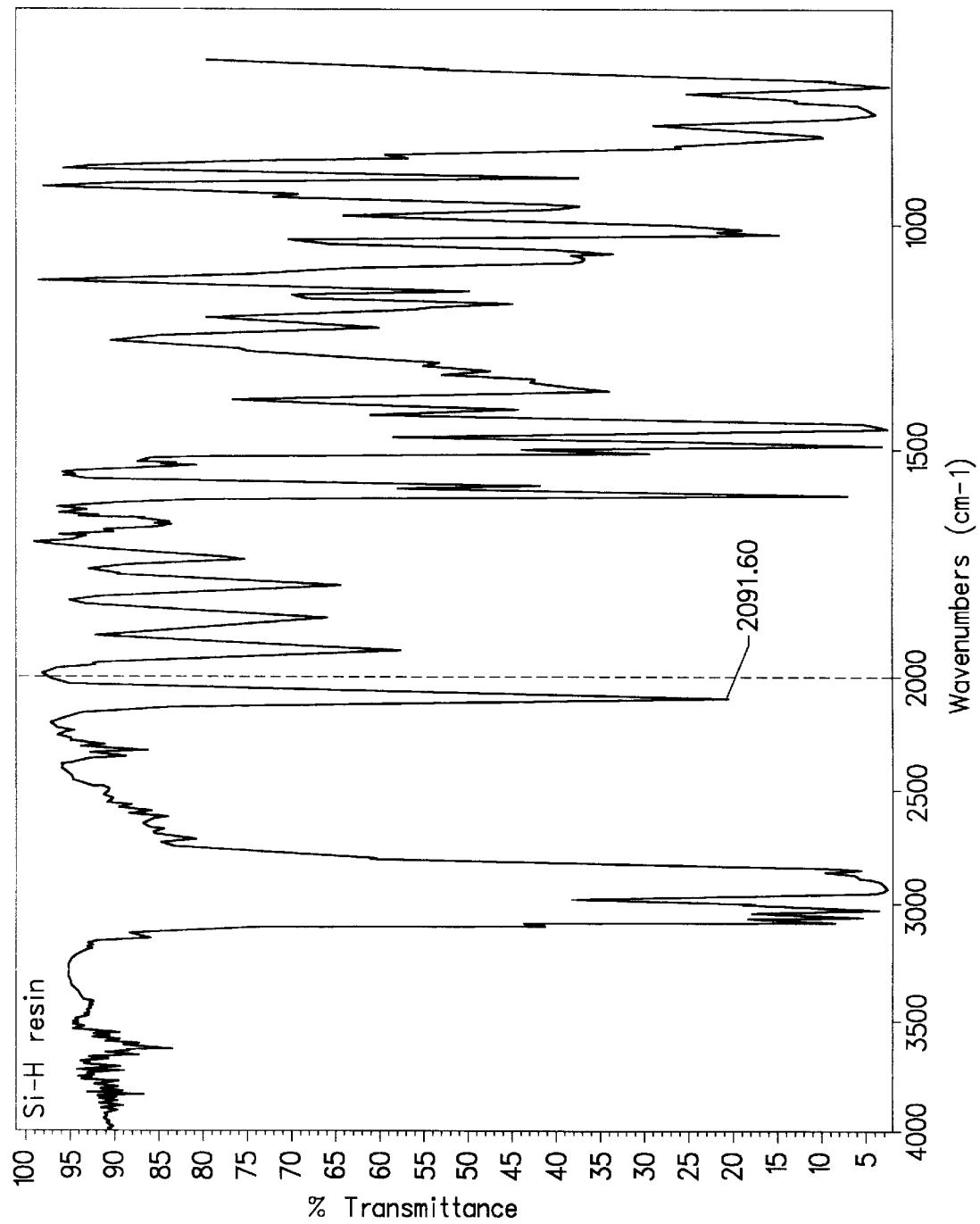
FIG. 7A illustrates the IR spectrum of resin VIIIa.
Figure 7B:
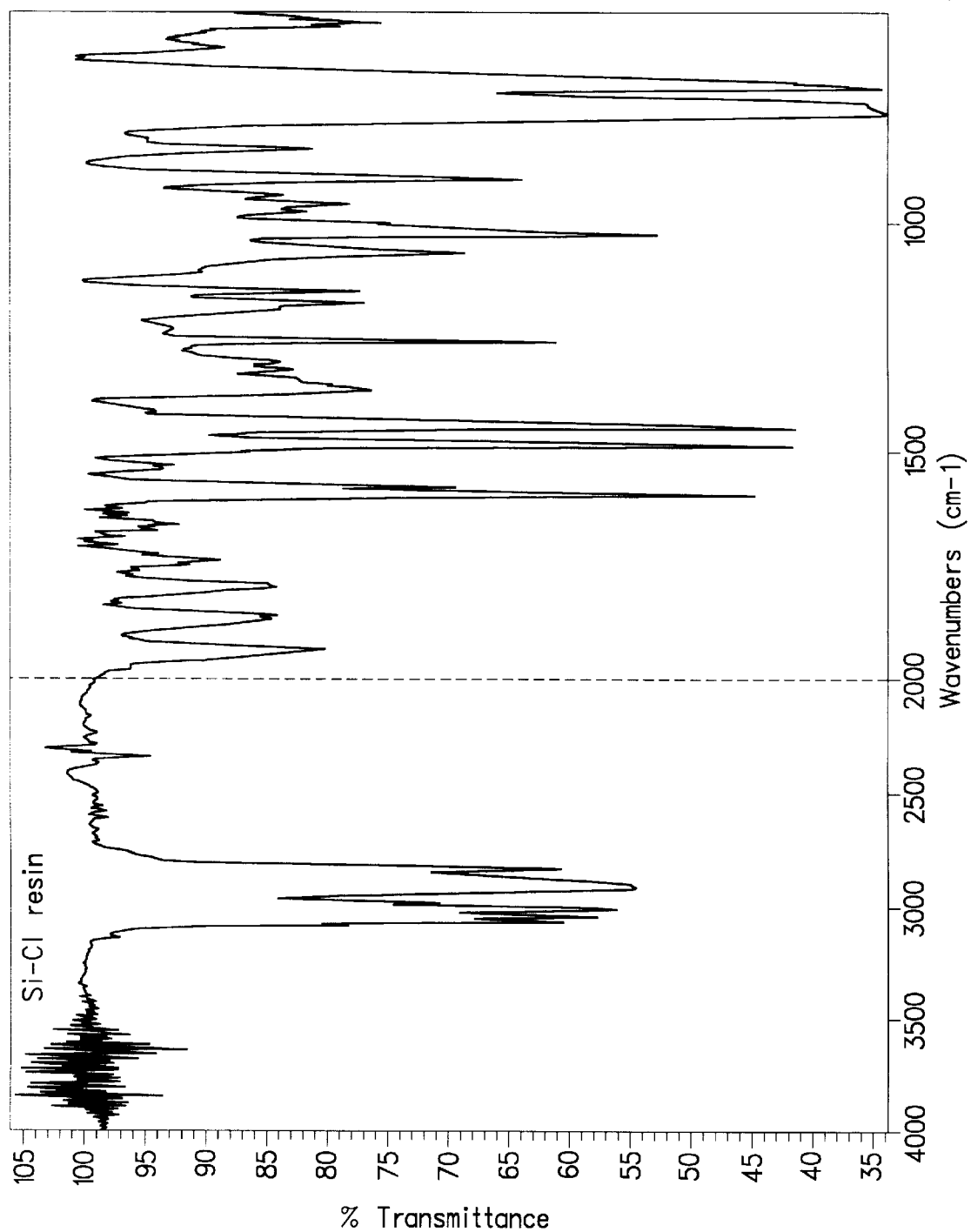
FIG. 7B illustrates the IR spectrum of chloride resin XI.
Figure 7C:
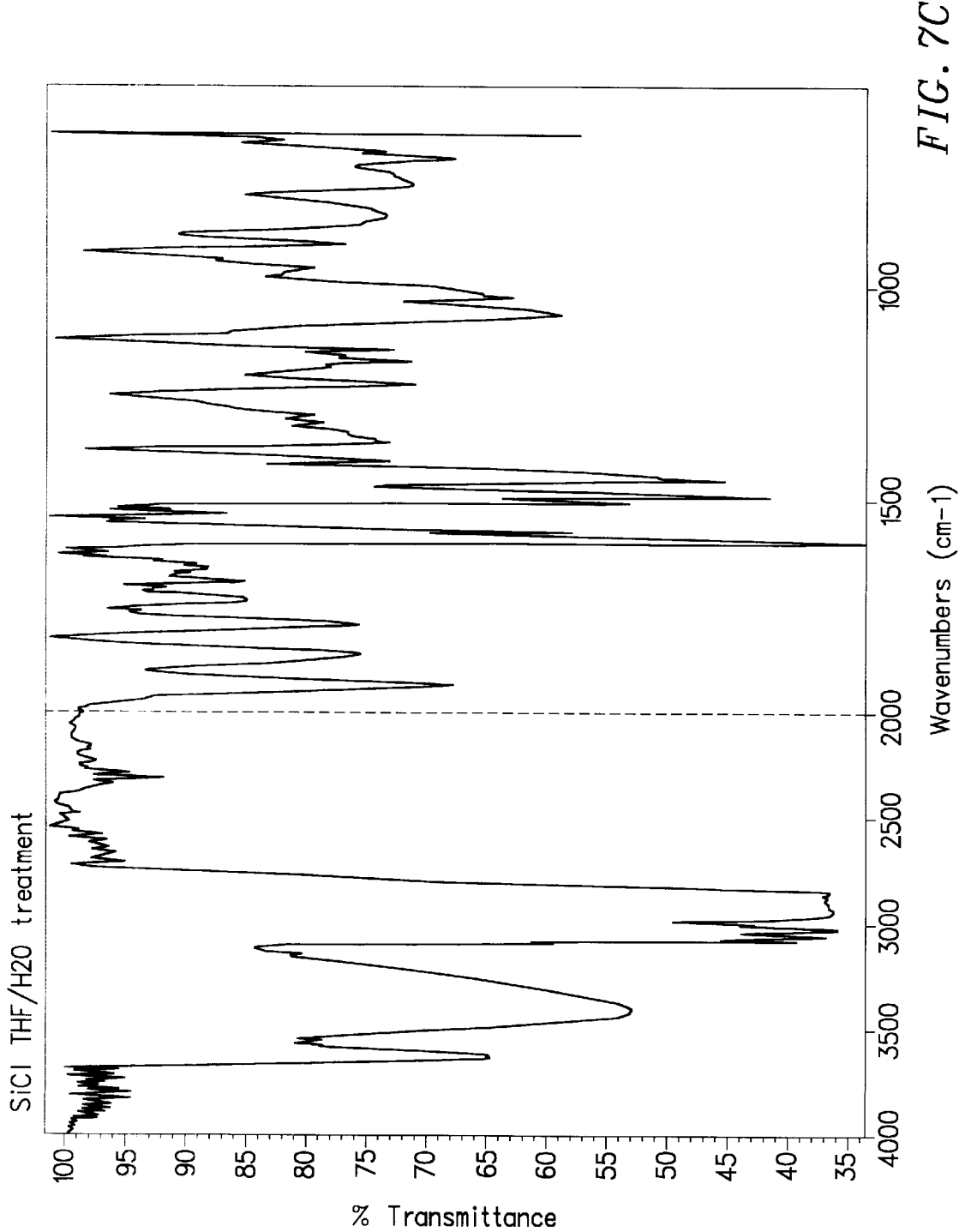
FIG. 7C illustrates the IR spectrum of chloride resin XI after treatment with $THF/H_2O$.

The silanes prepared with the general formula (P)—(S)—CRR'—Si $R_1R_2H$ are stable to moisture. For example, PS-DES silane resin VIIIa is stable to THF/$H_2O$ (1:1, 20 mins) as shown by IR analysis (FIG. 7A). However, the activated resins (P)—(S)—CRR'—Si $R_1R_2Y$ where Y is a halide are unstable to moisture. For example, after treatment with THF/$H_2O$ (1:1, 20 mins), the PS-DES-Cl resin Xl whose IR spectrum is shown in FIG. 7B decomposes to give a silanol as indicated by a broad absorption in the IR range of 3200–3700 cm$^{-1}$ as shown in FIG. 7C.

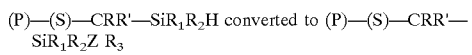

Silanes of the general formula (P)—(S)—CRR'—Si $R_1R_2H$ may be used for the hydrosilylation of carbonyl compounds to give silyl ethers. In solution phase, hydrosilylation of ketones and aldehydes giving silyl ethers can be effected by using a variety of catalysts including rhodium catalyst such as $RhCl(PPh_3)_3$ [Semmelhack; Misra, J. Org. Chem., 47, 2469 (1982)], titanium catalysts such as $Cp_2TiPh_2$ [Nakano; Nagai, Chem. Left., 481 (1988)] F$^-$[Goldberg; Rubina; Shymanska; Lukevics, Synth. Commun., 20, 2439(1990)], etc. In addition, these polymeric silanes may be used to hydrosilylate enones or acrylates by 1,4 addition to afford intermediate silyl enol ethers or silyl ketene acetals using transition metal catalysts (e.g. Pt) [Johnson; Raheja J. Org. Chem. 59, 2287 (1994).].

The silanes can also be reacted with alcohols, thiols, or carboxylic acids with or without F—, Rh, or Pt catalysts to form silyl ethers, thiolates, or esters [U.S. Pat. No. 5,047526 to Yamamoto; Doyle, M. P., et al., Organometalics, 13,1081 (1994); Tanabe, Y., et al, Tetrahedron Lett., 35, 8413 (1994)].

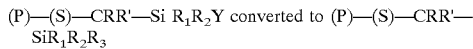

The activated Si-Y resin is effective for attachment of a variety of compounds. For example, the loading of alcohols to the silyl chloride resin can be accomplished by using a combination of alcohol and imidazole in dichloromethane. Cleavage of silyl ether resin was effected by using the reagent HF/pyridine in THF. Other types of cleavage include protodesilylation by using AcOH/THF/$H_2O$, TFA/$H_2O$, HCl/$H_2O$, etc. Loading of aromatic compounds, acetylenes, olefins, and alkyls to the support bound silyl chloride can be done by using the corresponding aryl, alkynyl, alkenyl, alkyl lithium or Grignard reagents.

Silanes of the present invention can also be transformed into silyl compounds with the substituent $ZR_3$ wherein Z is oxygen or sulfur and $R_3$ is either alkyl, cycloalkyl or aryl. Particular examples of Z $R_3$ groups include alkoxy and aryloxy (RO$^-$), thioether (RS$^-$), and carboxylate (RCOO$^-$).

Silanes of the present invention can also be transformed into silyl compounds with the substituent $NR_{10}R_{11}$ wherein $R_{10}$ and $R_{11}$ are each independently selected from the group consisting of alkyl, cycloalkyl, and aryl.

Figure 8:
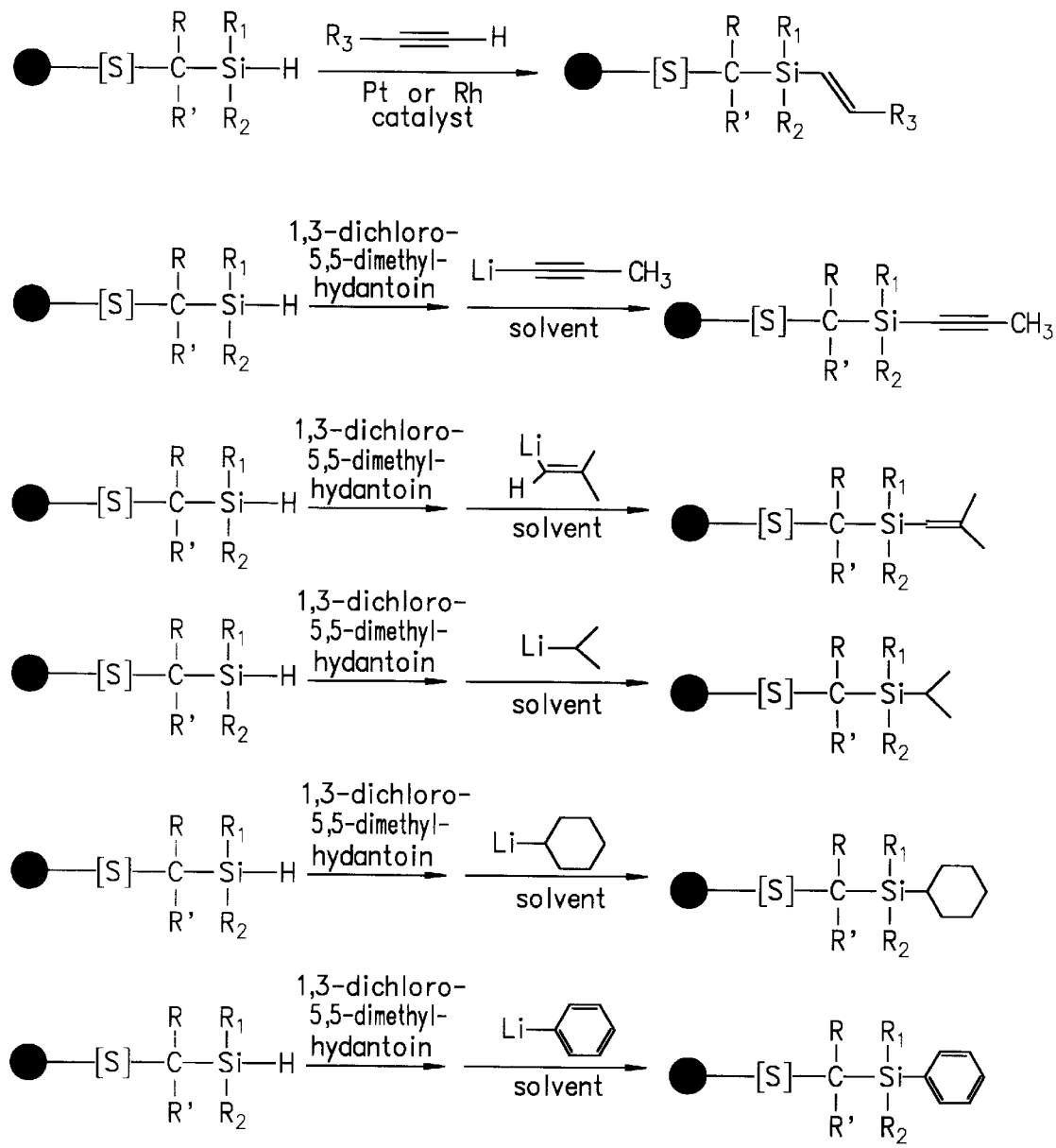
FIG. 8 illustrates a series of reaction schemes for the alkylation of silanes with the general formula (P)—(S)—CRR'—$SiR_1R_2H$.
Figure 9:
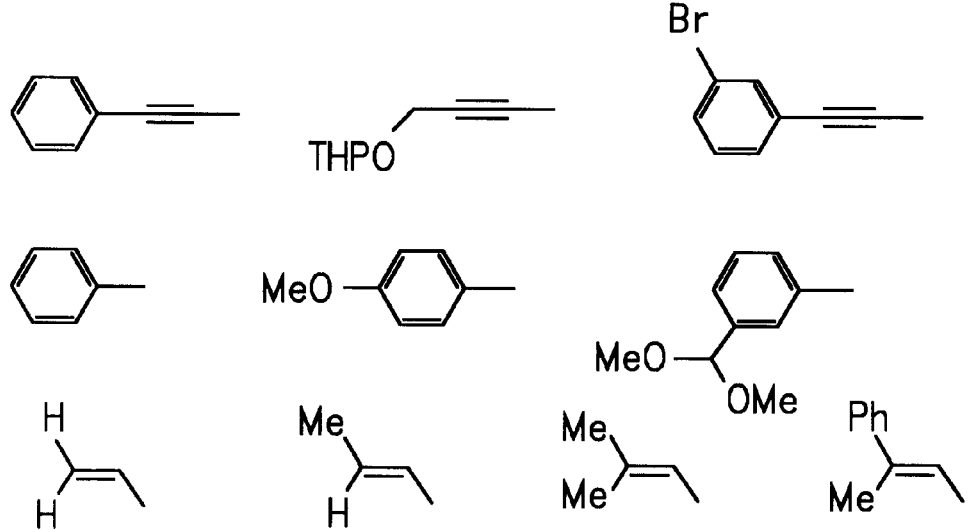
FIG. 9 illustrates examples of $R_4$ substituents which may be used in the compositions of the present invention.

Silanes of the present invention can also be transformed into silyl compounds with the substituent $R_4$ wherein $R_4$ is either alkyl, cycloalkyl, alkenyl, or aryl. Several illustrative reaction schemes for the performing this transformation are illustrated in FIG. 8. Examples of suitable $R_4$ groups are include but are not limited to groups such as those illustrated in FIG. 9.

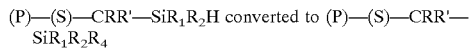

(P)—(S)—CRR'—$SiR_1R_2H$ converted to (P)—(S)—CRR'—$SiR_1R_2R_4$

Hydrosilylation of olefins or alkynes may be used for the attachment of alkyl or alkenyl groups, respectively. Direct treatment of the lithium or Grignard reagents with the Si-H resin may also be used for carbon linkages (e.g. aryl groups, alkynes, and olefins). Therefore, reactions of the corresponding RM reagents (R=aryl, alkynyl, alkenyl, alkyl) with Si-H resin should give aryl, alkynyl, alkenyl, alkyl silanes respectively. For a solution phase analogy of the metalation, see Breliere; Carre; Corriu; Royo; Man, Organometallics, 13, 307 (1994). Also, reaction of silane resins with alkynes in the presence of $H_2PtCl_6/I_2$)LiI may be used to give alkynylsilanes, see Voronkov; Ushakova; Tsykhanskaya; Pukhnarevich, *J. Organomet. Chem.*, 264, 39 (1984) for solution phase examples.

EXAMPLES

Example 1

Synthesis of olefin resin (I)

Scheme 2
Allylation of Merrifield resin

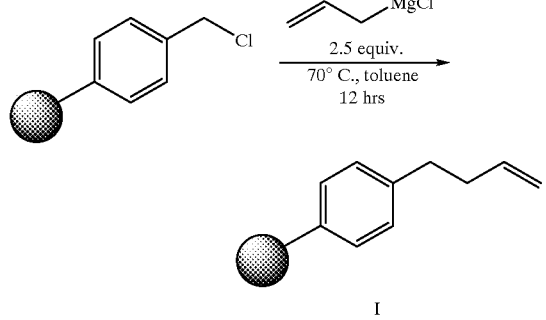

A dry 1-L, 3- necked flask was fitted with a mechanical stirring paddle, temperature controller thermocouple, and a nitrogen/vacuum inlet. Care was taken to ensure that the stirring paddle did not touch the bottom of the flask. This reaction setup was charged with 50 g of Merrifield resin (100–200 mesh, Novabiochem, Lot A16510, 0.85 mmol/g, 42.5 mmol). The vessel was purged with argon for 20 mins. The reactor was charged with 400 mL anhydrous toluene and agitated for 5 minutes to swell the resin well. Allylmagnesium chloride (55 mL, 2.0M in THF, 110 mmol) was added slowly to the reactor with a syringe and the reaction mixture was agitated at room temperature for 30 mins. The suspension was then heated to 70° C. for 12 hrs (A West condensor was equipped for the reflux of THF). The mixture was allowed to cool to room temperature. The agitation was stopped and the liquid removed via vacuum filter tube. The reactor was charged with 400 mL THF and agitated for 30 mins. Then the liquid was removed via vacuum filter tube. The reactor was charged with 400 mL of THF/1N HCl (3:1) and heated to 45° C. for 12 hrs. The liquid was removed via vacuum filter tube. The reaction mixture was washed with 2×THF, 2×MeOH, and finally with THF. The product was collected with a glass funnel and suction dried for 15 mins. The product was transferred to a glass tray and dried in a vacuum oven at 65° C. for 12 hrs. IR (cm$^{-1}$), 1639.26 (C=C).

Examples 2–5

Synthesis of gel-type polystyrene silane resin (VIII)

Scheme 3
Preparation of Polystyrene-Dialkylsilane resin

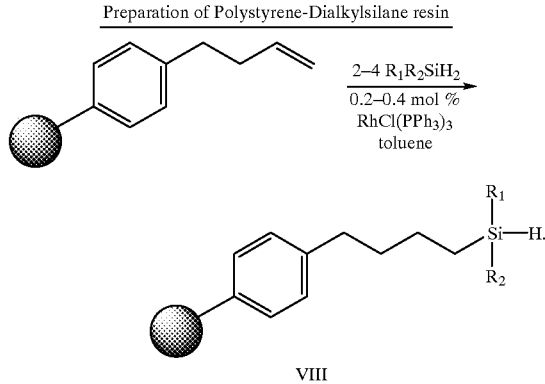

A representative procedure consists of the following ($R_1$= $R_2$=Et). A dry 500-mL, 2- necked flask was fitted with a mechanical stirring paddle, and a nitrogen/vacuum inlet. Care was taken to ensure that the stirring paddle did not touch the bottom of the flask. To this reaction setup was charged with 30 g (25.5 mmol) of allyl resin (I). The vessel was purged with argon for 20 mins. The reactor was charged with 240 mL toluene solution of RhCl(PPh$_3$)$_3$ (96 mg, 0.1 mmol, 0.4 mol %) and agitated for several minutes to swell the resin. Et$_2$SiH$_2$ (6.4 mL, 50.0 mmol) was added dropwise with a syringe at room temperature and the reaction mixture was agitated at room temperature for 2 hrs. The liquid was removed via vacuum filter tube. The reaction mixture was washed with 3×toluene, 3×THF. The product was collected with a glass funnel and suction dried for 15 mins. The product was transferred to a glass tray and dried in a vacuum oven at room temperature. IR (cm$^-$), 2100.14 (Si-H), 1229.59 (Si-C), EA: Si, 0.83 meq/g.

Similarly, the above procedure was employed with different silanes ($R_1R_2SiH_2$). The results are summarized in the table below, where PS corresponds to gel type polystyrene and AP corresponds to ArgoPore.

| Example | P | $R_1$ | $R_2$ | Reaction Temperature | IR (cm$^{-1}$) (Si—H) | Si EA: mmol/g |
|---|---|---|---|---|---|---|
| 2(VIIIa) | PS | Et | Et | 25° C. | 2100 | 0.83 |
| 3(VIIIb) | PS | Ph | Ph | 50° C. | 2121 | 0.80 |
| 4(VIIIc) | PS | iPr | iPr | 25° C. | 2090 | 0.23 |
| 5(VIIId) | AP | Et | Et | 50° C. | 2100 | 0.70 |

Example 6

Synthesis of gel type polystyrene dichlorosilane resin (IX)

Scheme 4
Preparation of PS dichlorosilane resin

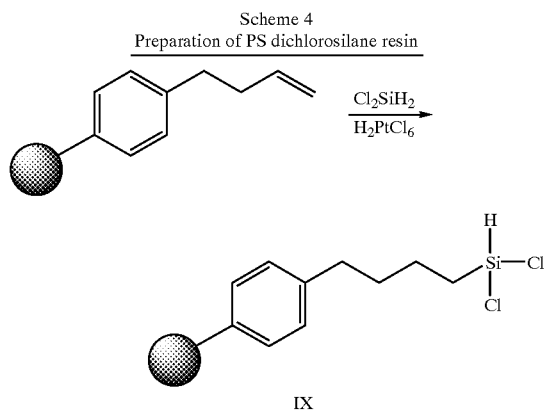

IX

To a dry 10-mL flask was charged with 0.5 g (0.5 mmol) of allyl resin (I). The vessel was purged with argon for 20 mins. The reactor was charged with 3.5 mL toluene solution. To this solution was added 0.15 mL of $H_2PtCl_6.6H_2O$ (0.02 M). $H_2SiCl_2$ (0.58 mL, 25% xylene) was added dropwise with a syringe at room temperature and the reaction mixture was agitated at room temperature for 12 hrs. The liquid was removed via vacuum filter tube. The reaction mixture was washed with 4×toluene and dried in a vacuum at room temperature. IR (cm$^{-1}$), 2202.56 (Si-H). Elemental Analysis: Si: 0.70 meq/g.

Example 7

Synthesis of gel type polystyrene dimethylsilane resin (X)

Scheme 5
Preparation of resin X

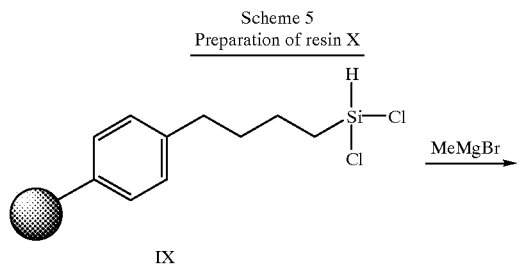

IX

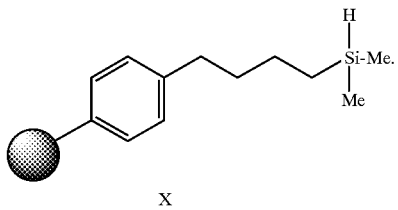

X

To the previous prepared dichlorosilane resin (IX) in diethyl ether (4 mL) under argon at 0° C. was added 3 equiv. of methylmagnesium bromide. The mixture was allowed to warm up to room temperature. After 2 hrs of reaction, the mixture was filtered, washed with 3×THF, 3×THF/H$_2$O (1:1), 3×THF, and dried in a vacuum at room temperature. IR (cm$^-$), 2105.26 (Si-H), 1250.07 (Si-C). Elemental Analysis: Si: 0.50 meq/g.

Examples 8–11

Synthesis of gel-type polystyrene silicon chloride resin (XI)

Scheme 6
Chlorination of resin VIIIa

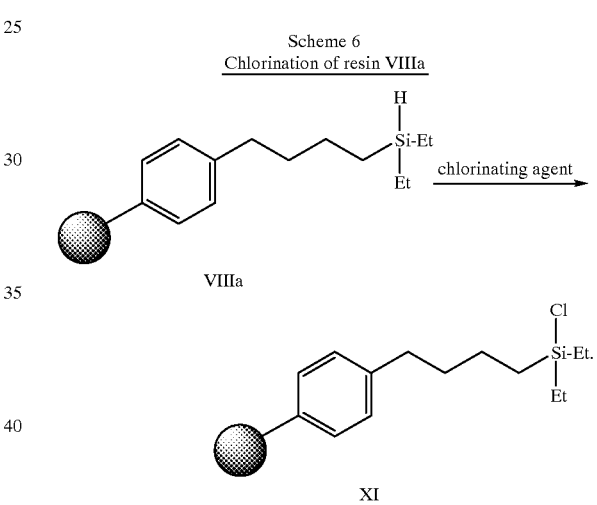

Chlorination with trichloroisocyanuric acid

To a 5 ml round bottle flask was added under argon 100 mg of silane resin (VIIIa), and 0.66 equiv. of trichloroisocyanuric acid in 1 mL DCM. After 40 mins, the mixture was filtered and washed with DCM (5× 3 ml). The resin was used for further transformation immediately after the DCM washing.

Chlorination with trityl chloride

To a 5 ml round bottle flask was added under argon 100 mg of silane resin (VIIIa), and 2.5 equiv. of trityl chloride. Then solvent ClCH$_2$CH$_2$Cl/CH$_3$NO$_2$ (4:1, 1 ml) was added and the reaction was kept at 30° C. for 23 hrs. The mixture was filtered and washed with DCM (3×3ml). The resin was used for further transformation immediately after the DCM washing.

Chlorination with N-chlorosuccinimide

To 100 mg of resin (VIIIa, 0.085 mmol) in 5 mL round bottle flask under argon was added 29 mg N-chlorosuccinimide (0.21 mmol, 2.5 equiv.) in dichloromethane (1 mL). The reaction mixture was agitated and monitored by IR for the disappearance of the Si-H peak at 2100 cm$^{-1}$ (7 hrs). The resin was washed 2 times with 2 ml DCM and used immediately for further reactions.

Chlorination with 1,3-dichloro-5,5-dimethyehydantoin

To a 5 ml round bottom flask was added under argon 100 mg of resin VIIIa (0.75 mmol/g, 0.075 mmol), and a small magnetic stirring bar. 44 mg (0.225 mmol) of 1,3-dichloro-5,5-dimethylhydantoin in 0.8 mL DCM was then added. The mixture was stirred at room temperature. After 1.5 h, the mixture was washed with DCM (3×3 mL) and dry THF (3×3 mL) under argon. The resin was used immediately for further transformations.

Example 12

Synthesis of gel type polystyrene silicon bromide resin (XII)

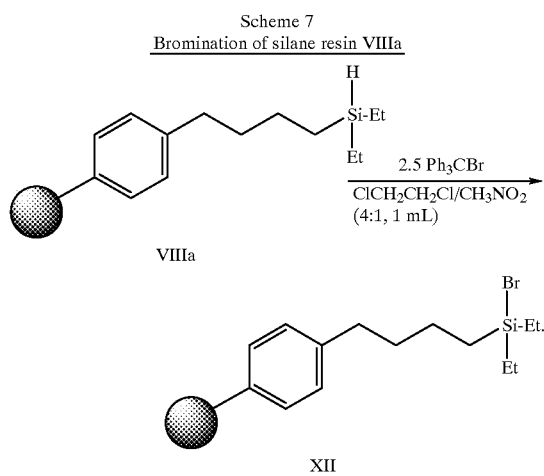

To a 5 ml round bottle flask was added under argon 100 mg of silane resin (VIIIa), and 2.5 equiv. of trityl bromide. Then solvent ClCH$_2$CH$_2$Cl/CH$_3$NO$_2$ (4:1, 1 ml) was added. After 2 hrs, the mixture was filtered and washed with DCM (5×2ml). The combined filtrate was mixed with 20 mg of anthracene and the mixture used for GC analysis of the loading of the silane resin.

Example 13

Synthesis of ArgoGel allyl resin (VI)

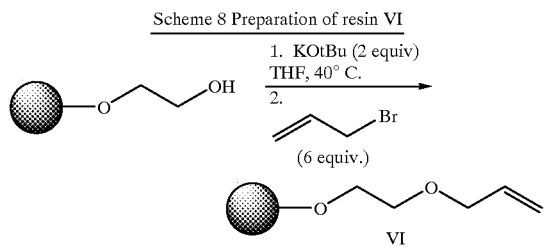

A dry 250-mL, 2- necked flask was fitted with a mechanical stirring paddle, and a nitrogen/vacuum inlet. Care was taken to ensure that the stirring paddle did not touch the bottom of the flask. To this reaction setup was charged with ArgoGel-OH (0.43 mmol/g, 17.7 g, 7.6 mmol) resin. The vessel was purged with argon for 20 mins. The reactor was then charged with 140 mL THF and agitated for several minutes to swell the resin well. KOtBu (1.65M in THF, 9.2 mL, 15.2 mmol) was added dropwise with a syringe at room temperature and the reaction mixture was heated to 40° C. and agitated at this temperature for 2 hrs. After cooling the mixture to room temperature, allyl bromide (4 mL, 46.2 mmol) was added at room temperature and heated to 40° C. for 12 hrs. H$_2$O (100 mL) was added after the mixture was cooled to room temperature and the mixture was agitated for 5 mins. The liquid was removed via vacuum filter tube. The reaction mixture was washed with 2×THF/H$_2$O (1:1), 2×THF/1N HCl (2:1), 2×H$_2$O, 2×THF, 2×MeOH. The product was collected with a glass funnel and suction dried for 15 mins. The product was transferred to a glass tray and dried in a vacuum oven at room temperature. $^{13}$C NMR (300 MHz, C$_6$D$_6$) 69.51, 71.57, 115.55, 135.31.

Example 14

Synthesis of ArgoGel silane resin (XIII)

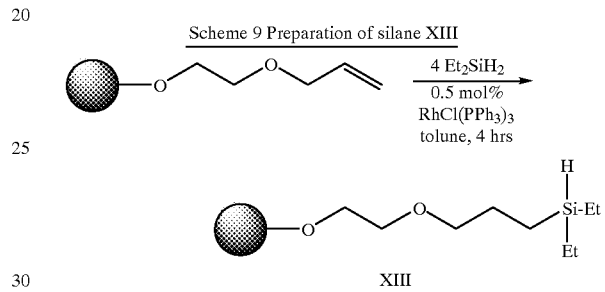

A dry 100-mL, 2- necked flask was fitted with a mechanical stirring paddle, and a nitrogen/vacuum inlet. Care was taken to ensure that the stirring paddle did not touch the bottom of the flask. To this reaction setup was charged with 5 g (2.15 mmol) of ArgoGel allyl resin (VI). The vessel was purged with argon for 20 min. The reactor was charged with 50 mL toluene solution of RhCl(PPh$_3$)$_3$ (10 mg, 0.01 mmol) and agitated for several minutes to swell the resin. Et$_2$SiH$_2$ (1.1 mL, 8.5 mmol) was added dropwise with a syringe at room temperature and the reaction mixture was agitated at room temperature for 4 hrs. The liquid was removed via vacuum filter tube. The reaction mixture was washed with 3×toluene, 3×THF. The product was collected with a glass funnel and suction dried for 15 min. The product was transferred to a glass tray and dried in a vacuum oven at room temperature. $^{13}$C NMR (300 MHz, C$_6$D$_6$) 2.43, 6.47, 7.76, 24.66, 69.48, 73.39. EA: Si, 0.46 meq/g.

Example 15

Synthesis of macroporous polystyrene allyl resin (IV)

A dry 250-mL, 2- necked flask was fitted with a mechanical stirring paddle, temperature controller thermocouple, and a nitrogen/vacuum inlet. Care was taken to ensure that the stirring paddle did not touch the bottom of the flask. This reaction setup was charged with 16.5 g of ArgoPore chloride resin (0.89 mmol/g, 14.7 mmol). The vessel was purged with argon for 20 mins. The reactor was charged with 120 mL anhydrous toluene and agitated for 5 minutes to swell the resin well. Allylmagnesium chloride (19 mL, 2.0M in THF, 38.0 mmol) was added slowly to the reactor with a syringe and the reaction mixture was agitated at room temperature for 30 mins. The suspension was then heated to 55° C. for 12 hrs. The mixture was allowed to cool to room temperature. The agitation was stopped and the liquid removed via vacuum filter tube. The reactor was charged with 120 mL THF and agitated for 30 mins. Then the liquid was removed via vacuum filter tube. The reactor was charged with 120 mL of THF/1N HCl (3:1) and heated to 45° C. for 12 hrs. The liquid was removed via vacuum filter tube. The reaction mixture was washed with 2×THF, 2×MeOH, and finally with THF. The product was collected with a glass funnel and suction dried for 15 mins. The product was transferred to a glass tray and dried in a vacuum oven at 65° C. for 12 hrs. IR (cm$^{-1}$), 1639.26 (C=C).

Example 16

Synthesis of macroporous polystyrene silane resin (XII)

A dry 50-mL, 2- necked flask was fitted with a mechanical stirring paddle, and a nitrogen/vacuum inlet. Care was taken to ensure that the stirring paddle did not touch the bottom of the flask. To this reaction setup was charged with 3 g (2.67 mmol) of ArgoPore allyl resin (IV). The vessel was purged with argon for 20 min. The reactor was charged with 24 mL toluene solution of RhCl(PPh$_3$)$_3$ (13 mg, 0.01 mmol) and agitated for several minutes to swell the resin. Et$_2$SiH$_2$ (1.5 mL, 11.6 mmol) was added dropwise with a syringe at room temperature and the reaction mixture was agitated at room temperature for 6 hrs. The liquid was removed via vacuum filter tube. The reaction mixture was washed with 3×toluene, 3×THF. The product was collected with a glass funnel and suction dried for 15 min. The product was transferred to a glass tray and dried in a vacuum oven at room temperature. IR (cm$^{-1}$), 2100.14 (Si-H), 1239.83 (Si-C). EA: Si, 0.41 meq/g.

Example 17

Synthesis of Macroporous Polystyrene Silane Resin (XIV)

Scheme 10 Preparation of silane resin XIV

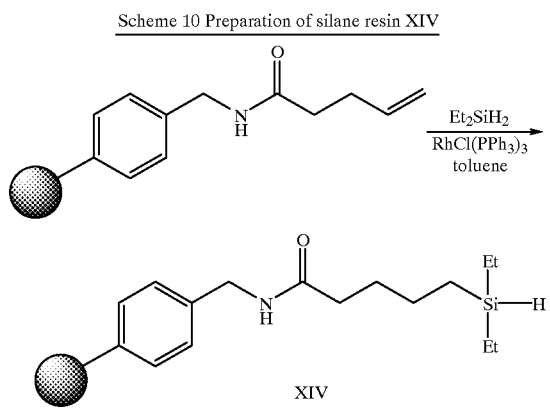

A dry 5-mL round-bottom flask was charged with 100 mg (0.07 mmol) of allyl resin (VII). The vessel was purged with argon for 20 mins. The reactor was charged with 0.8 mL of a solution containing 6-mg of RhCl(PPh$_3$)$_3$ in toluene; the solution was agitated for several minutes to swell the resin. Et$_2$SiH$_2$ (30 μl) was added dropwise with a syringe at room temperature; the reaction mixture was agitated at room temperature for 12 hrs. The liquid was removed via vacuum filter tube. The reaction mixture was washed three times with toluene and three times with THF. The product was dried under vacuum at room temperature. IR (cm$^{-1}$), 1947.24 (Si-H). Elemental Analysis: Si, 0.22 meq/g.

Examples 18–21

Load Alcohols via Silicon Chloride (XI)

Scheme 11 Loading of alcohols through silyl chloride

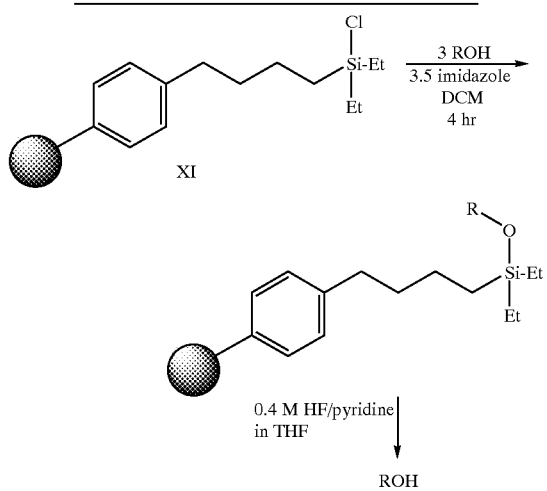

Silicon chloride resin (XI) is produced as described in examples 8–10. The alcohols ((s)-(−)-1-(2-methoxybenzoyl)-2-pyrrolidine-methanol, 1-naphthaleneethanol, 1-(4-methoxyphenoxy)-2-propanol, and trans-2-phenylcyclohexanol, 100 mg) were loaded by treating the Si-Cl resin with a DCM solution of 3 equiv. of alcohol, 3.5 equiv. imidazole for 4 hrs at room temperature under argon. The mixture was then washed with 2×DMF, 2×DMF/H$_2$O (1:1), 2×THF/H$_2$O (1:1), 2×THF.

Cleavage of the resulting coupled was demonstrated as follows. The cleavage was done using a 0.4M HF/pyridine solution in THF for 2 hrs. The filtrate was treated with a saturated solution (3 mL) of NaHCO$_3$, an EtOAc solution of anthracene (as internal standard). After extraction with EtOAc, the organic layer was used for GC. The yield calculated for the alcohols are 79%, 91%, 75%, and 60% respectively.

Examples 22–23

Load Alcohols Directly to Silane Using TBAF

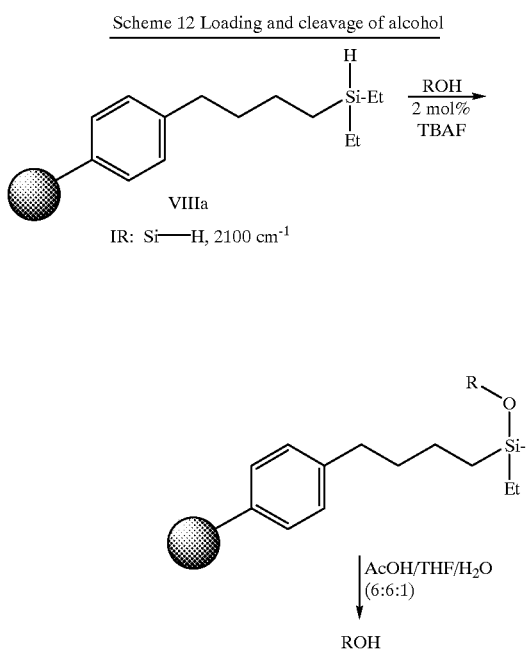

Scheme 12 Loading and cleavage of alcohol

To 800 mg of resin VIIIa in 25 mL round bottle flask under argon was transferred in 1.5 equiv. of alcohol in 6.4 mL NMP using syringe. Three alcohols were used, namely, 1-naphthaleneethanol, and 1-(4-methoxyphenoxy)-2-propanol. While stirring, 2 mol % of tetrabutyl ammonium fluoride (TBAF) in THF was added and the reaction mixture was agitated (monitored by aliquot for IR for the disappearance of the Si-H peak, typically 6–8 hours). Then the mixture was filtered and washed with 2×toluene, 1×MeOH, 4×THF and dried under vacuum in a dessicator. IR of all resins showed disappearance of the Si-H peak at 2100 cm$^{-1}$.

Cleavage of the resulting resin-bound silyl ether was performed using AcOH/THF/H$_2$O (6:6:1) for 8 hrs at room temperature. The Si-OR resins were treated with AcOH/THF/H$_2$O, the cleavage mixture filtered, and the filtrate concentrated by Speedvac (rt, 80 mins) to obtain the alcohol products. Alcohol compounds were recovered in approximately 65% yield

Example 24

Load Alcohol Directly to Silane via Rh$_2$(pfb)$_4$

Doyle and co-workers have utilized Rh$_2$(pfb)$_4$ as catalyst for the synthesis of silyl ethers from silanes and both primary and secondary alcohols [Doyle, M. P., et al., J. Org. Chem., 55, 25] (1990). The dimeric catalyst Rh$_2$(pfb)$_4$ was prepared according to a literature procedure and used in alcoholysis experiments with resin VIIIa. It was found that loading of primary alcohols is complete in about 3 hrs by using 1 mol % catalyst as indicated by IR spectroscopy, similar to what was reported by Doyle for solution-phase examples.

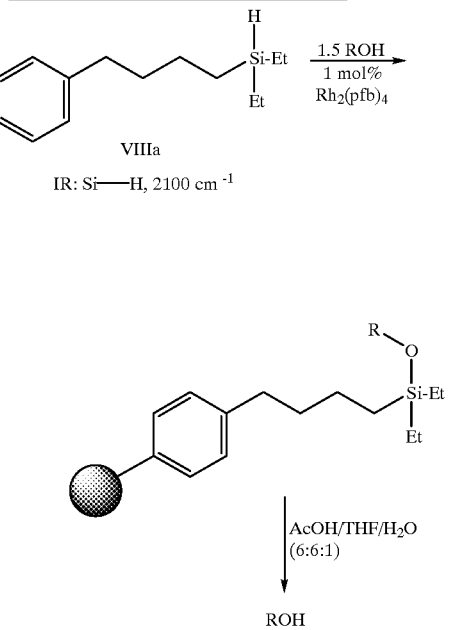

Scheme 13 Loading and cleavage of alcohols

We were able to successfully load representative primary alcohols to silane resin VIIIa and cleave the resins to afford high yields of alcohol products (Scheme 13). In a typical experiment, 200 mg PS-DES-silane resin was combined with a DCM solution of 1.7 mg of Rh$_2$(pfb)$_4$ in 10 mL round bottle flask under argon. Then 66 mg of (s)-(–)-1-(2-methoxybenzoyl)-2-pyrrolidinemethanol was added at room temperature and the reaction was monitored by IR. After 3 hrs, the reaction was complete (as evidenced by the disappearance of the Si-H stretch at 2100 cm$^{-1}$), the reaction mixture was filtered, and washed with 3×DCM, 2×toluene, 2×THF/H$_2$O (1:1), 3×THF. The product was dried under vacuum in a dessicator. This product was then treated with AcOH/THF/H$_2$O (6:6:1) for 12 hrs and the filtrate was concentrated by speedvac (rt, 80 mins) to obtain alcohol with 99.3% yield (GC, anthracene as internal standard).

Examples 25–27

Use as a "Traceless" Linker

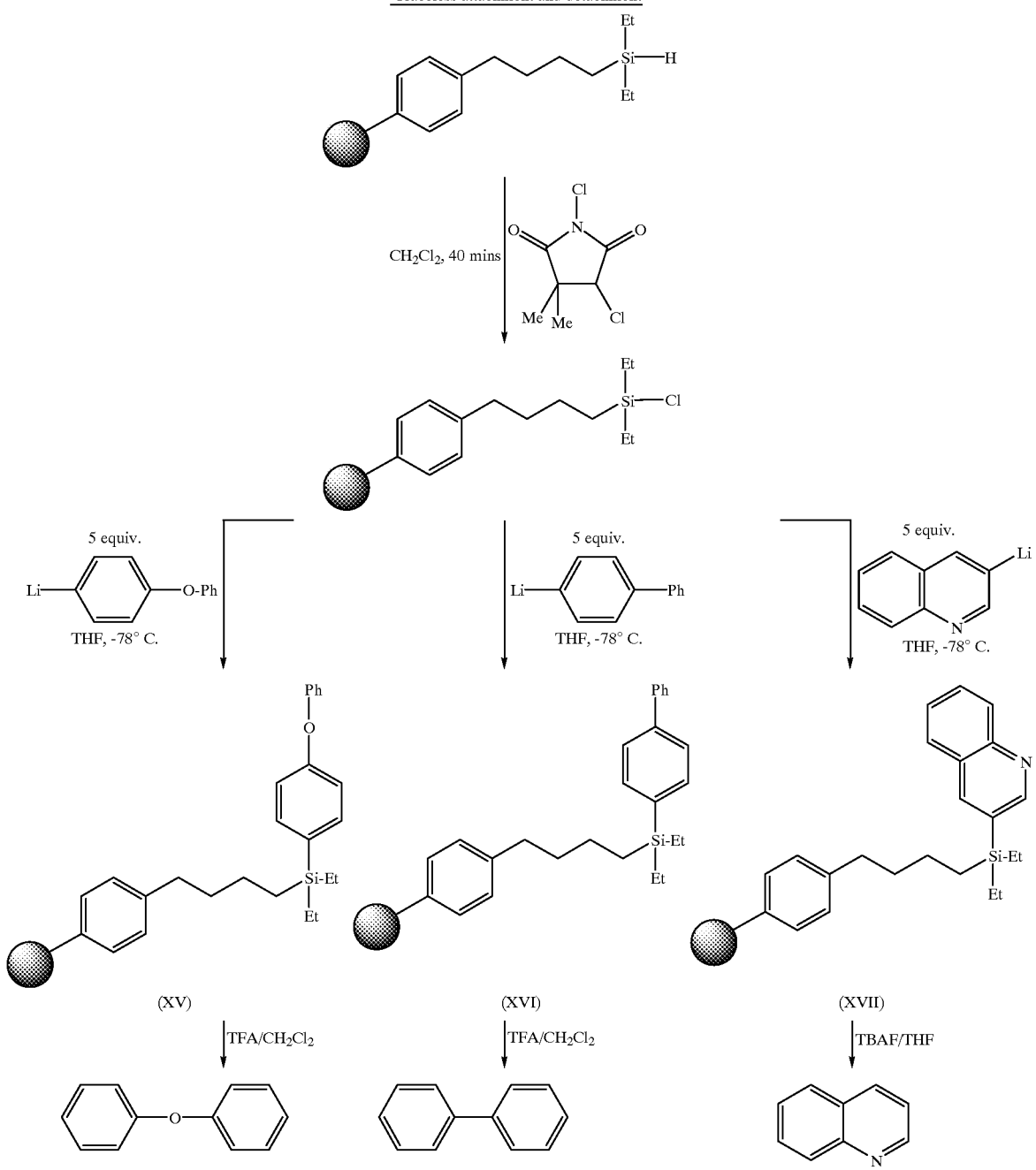

Scheme 14
Traceless attachment and detachment

To 500 mg of resin VIIIa (0.75 mmol/g, 0.375 mmol) was added 60 mg of trichloroisocyanuric acid (0.258 mmol, 0.774 mmol Cl) in 7.5 mL DCM under Ar. The mixture was stirred for 40 mins at rt. After washing with DCM×5, THF×3, DCM×3, THF×5 under Ar, to the resin was added at −78° C. 5 equiv. of 4-phenoxyphenyllithium (generated by treating 4-phenoxyphenyl bromide with 1 equiv. of nBuLi at −78° C. for 1 hr) in 5 mL THF. The reaction mixture was allowed to warm up in 4 hrs. The resulting mixture was washed with THF×3, THF/H$_2$O (1:1)×3, THF×3, DCM and dried under vacuum for 12 hrs to give product (XV). IR (cm$^{-1}$): 1239.8 (Ar-O).

To the aromatic compound loaded silane resin (100 mg) was added TFA/DCM (1:1). The mixture was stirred at rt for 3 hrs. The mixture was filtered and washed with DCM×3. The combined filtrate was treated with saturated NaHCO$_3$. The organic layer was used for GC quantification (using anthracene as internal standard). Yield: 80%.

Synthesis and cleavage of product (XVI)

Experimental: similar to previous method. Biphenyl was cleaved by using TFA/DCM (1:1) in 3 hrs in 70% yield (GC quantification using anthracene as internal standard).

Synthesis and cleavage of product (XVII)

Experimental: similar to previous method [3-lithioquinoline was synthesized in situ: To a t-BuLi solution in hexane (2 equiv.) was added dropwise a THF solution of 3-bromoquinoline (1 equiv.) under argon at −78° C. The mixture was stirred at this temperature for 5 mins before transferring via cannula to the in situ generated silyl chloride resin. cf. Woolard, F. X.; Paetsch J.; Ellman, J. A., *J. Org. Chem.*, 1997, 62, 6102.]. Quinoline was cleaved by using excess TBAF (1.0M in THF) for 12 hrs in 58% yield (GC quantification using anthracene as internal standard).

Example 28

Loading of acetylenes onto silicon chloride resin (XI)

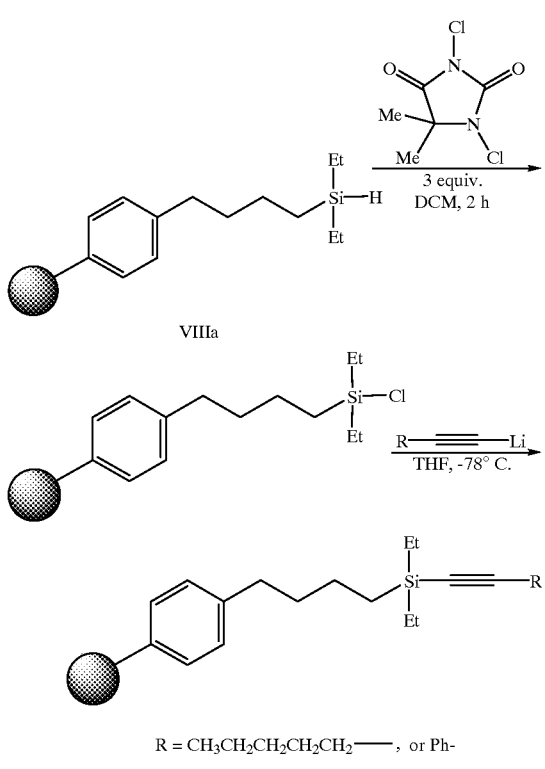

To 500 mg of silane resin VIIIa (0.75 mmol/g, 0.375 mmol) was added 225 mg of 1,3-dichloro-5,5-dimethylhydantoin (0.258 mmol, 0.774 mmol Cl) in 7.5 mL DCM under Ar. The mixture was stirred for 2 h at rt. After washing with DCM×3, THF×3 under Ar, to the resin was added at −78° C. 5 equiv. of lithium acetylide (generated by treating heptyne or phenylacetylene with I equiv. of nBuLi at −78° C. for 1 hr) in 5 mL THF. The reaction mixture was allowed to warm up in 4 hrs. The resulting mixture was washed with THF×3, THF/H$_2$O (1:1)×3, THF×3, DCM and dried under vacuum for 12 hrs to give products (I) [IR (cm$^{-1}$): 2167] or (II) [IR (cm$^{-1}$: 2153].

Example 29

Attaching alcohols or hydrosilylation of carbonyl compounds

A common procedure is provided for both either the direct attachment of alcohols to a silyl hydride or the hydrosilylation of carbonyl compounds. Hu, Y.; Porco, J. A., Jr. *Tetrahedron Lett.*, 1998, 39, 2711.

In this example, reactions were performed in 1-methyl-2-pyrrolidinone (NMP) using Wilkinson's catalyst

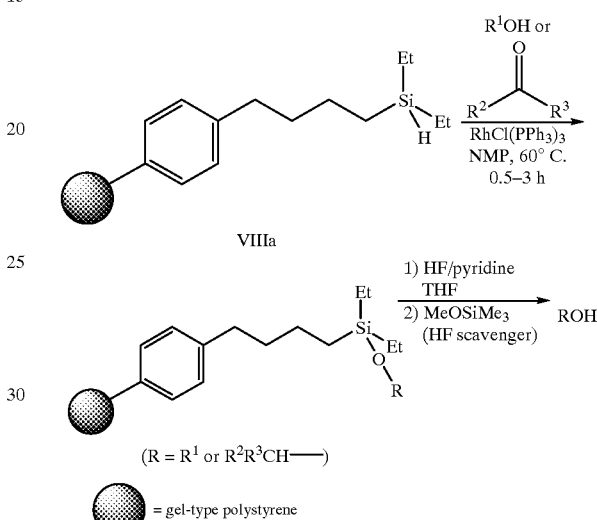

Alcoholysis of the resin was performed using a variety of alcohols, including primary alcohols (entries 1–2), secondary alcohols (entries 3–5), and phenols (entry 6). Direct attachment of Fmoc-aminoalcohol (entry 7) was unsuccessful under the reaction conditions. In the case of epiandrosterone (entry 5), chemoselective dehydrogenative coupling of the hydroxy functionality versus hydrosilylation of the carbonyl group was observed.

The following is a representative procedure for the direct loading of carbonyls or alcohols followed by HF cleavage. To a 10 mL round-bottom flask was added under argon 500 mg of silane resin VIIIa (0.375 mmol), 136.7 mg of 4-biphenylcarboxaldehyde (0.75 mmol), 14 mg of RhCl (PPh$_3$)$_3$ (4 mol %), 5 ml NMP (dried over molecular sieve) and a stirring bar. After heating (60° C.) with stirring for 2 h, the mixture was washed with NMP (3×5 mL), DCM (3×5 mL), and THF (3'5 mL). To the washed resin was added a 0.4M HF/pyridine solution in THF (5 mL). The solution was agitated for 2 h and MeOSiMe$_3$ (Aldrich, 0.5 mL, ~2 equiv. to HF used) added and the reaction further agitated for 2 h. The filtrate and the washing solvent (THF) were combined with internal standard (anthracene) for GC quantification. The procedure for the alcoholysis of silane resin VIIIa is similar to that used for the hydrosilylation of carbonyls.

Cleavage of the resin-bound silyl ethers generated by dehydrogenative coupling or hydrosilylation was performed using a HF/pyridine solution in THF. We have found the excess HF may be scavenged using methoxytrimethylsilane (MeOSiMe$_3$) as evidenced by the neutralization of the HF solution (pH analysis) and the formation of FSiMe$_3$ and MeOH as determined by GC analysis. This method is complimentary to the non-invasive cleavage method of AcOH/THF/H$_2$O (6:6:1) previously reported and allows direct concentration of cleavage mixtures without further purification.

The use of NMP as solvent was found to be advantageous to the success of the above transformations. Initial studies indicated that both silane alcoholysis and hydrosilylation of carbonyls with PS-DES resin in toluene did not proceed to a considerable extent as determined by the presence of residual Si-H IR stretch at 2100 cm$^{-1}$. In addition, the use of NMP as solvent largely prevented deposition of metallic rhodium on the resin beads. Representative results of the reaction of PS-DES resin with 2 equiv. of carbonyl derivatives and alcohols using 4 mol % RhCl(PPh$_3$)$_3$ are provided in the tables below.

Hydrosilylation of carbonyls with silane resin VIIIa using RhCl(PPh$_3$)$_3$ as catalyst followed by HF cleavage

| Entry | Carbonyl | Reaction time | Cleavage product | GC yield[a] |
|---|---|---|---|---|
| 1 | Ph-C$_6$H$_4$-CHO (4-phenylbenzaldehyde) | 2h | Ph-C$_6$H$_4$-CH$_2$OH | 88% |
| 2 | Br-C$_6$H$_4$-CHO (4-bromobenzaldehyde) | 0.5h | Br-C$_6$H$_4$-CH$_2$OH | 65% |
| 3 | 3-bromobenzaldehyde | 2h | 3-bromobenzyl alcohol | 72% |
| 4 | 2-bromobenzaldehyde | 3h | 2-bromobenzyl alcohol | 63% |
| 5 | MeO-C$_6$H$_4$-CHO (4-methoxybenzaldehyde) | 2h | MeO-C$_6$H$_4$-CH$_2$OH | 77% |
| 6 | benzaldehyde | 2h | benzyl alcohol | 84% |
| 7 | octanal | 3h | 1-octanol | 25%[b] |
| 8 | cyclohexanone | 3h | cyclohexanol | 61% |
| 9 | acetophenone | 3h | 1-phenylethanol | 50% |

[a] Yield for two steps (loading/cleavage) based on initial PS-DES silane loading and quantification by GC (anthracene as internal standard).
[b] An unidentified byproduct was observed by GC analysis.

| Alcoholysis of silane resin VIIIa using RhCl(PPh₃)₃ as catalyst followed by HF cleavage | | | |
|---|---|---|---|
| Entry | Alcohol | Reaction time | GC yield[a] |
| 1 | (2-methoxybenzoyl-pyrrolidinyl-methanol) | 2h | 87% |
| 2 | (1-naphthyl-ethanol) | 2h | 85% |
| 3 | (1-(4-methoxyphenoxy)-propan-2-ol) | 2h | 79% |
| 4 | (2-phenylcyclohexanol) | 3h | 66% |
| 5 | (steroid structure) | 2h | 70% |
| 6 | (2-phenylphenol / biphenyl-2-ol) | 2h | 50% |
| 7 | (HO-CH₂CH₂-NHFmoc) | 5h | no reaction |

[a]Yield for two steps (loading/cleavage) based on initial PS-DES silane loading and quantification by GC (anthracene as internal standard).

While the present invention is disclosed by reference to the preferred embodiments and examples detailed above, it is to be understood that these examples are intended in an illustrative rather than limiting sense, as it is contemplated that modifications will readily occur to those skilled in the art, which modifications are intended to fall within the scope of the present invention and appended claims.

We claim:

1. A modified solid support for use in solid phase synthesis which comprises: a solid support having a linker group extending therefrom having the general formula:

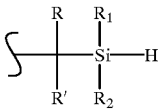

wherein

R and R' are each independently selected from the group consisting of hydrogen, alkyl, cycloalkyl, and aryl, and $R_1$ and $R_2$ are each independently selected from the group consisting of alkyl, cycloalkyl, aryl, alkoxy, aryloxy, fluorine, chlorine, iodine and bromine.

2. A modified solid support according to claim 1 wherein at least one of R and R' is a C1–6 alkyl.

3. A modified solid support according to claim 1 wherein R and R' are is each independently a C1–6 alkyl.

4. A modified solid support according to claim 1 wherein at least one of $R_1$ and $R_2$ is a C1–24 alkyl or aryl.

5. A modified solid support according to claim 1 wherein $R_1$ and $R_2$ are each independently a C1–24 alkyl or aryl.

6. A modified solid support according to claim 1 wherein at least one of $R_1$ and $R_2$ is a C1–6 alkyl or phenyl.

7. A modified solid support according to claim 1 wherein $R_1$ and $R_2$ are each independently a C1–6 alkyl or phenyl.

8. A modified solid support according to claim 1 wherein at least one of $R_1$ and $R_2$ is selected from the group consisting of methyl, ethyl, isopropyl, n-butyl, sec-butyl, and phenyl.

9. A modified solid support according to claim 1 wherein $R_1$ and $R_2$ are each independently selected from the group consisting of methyl, ethyl, isopropyl, n-butyl, sec-butyl, and phenyl.

10. A modified solid support according to claim 1 wherein at least one of $R_1$ and $R_2$ is selected from the group consisting of chlorine, bromine and iodine.

11. A modified solid support according to claim 1 wherein $R_1$ and $R_2$ are each independently selected from the group consisting of chlorine, bromine and iodine.

12. A modified solid support according to claim 1, wherein at least one of $R_1$ and $R_2$ is selected from the group consisting of chlorine.

13. A modified solid support according to claim 1, wherein $R_1$ and $R_2$ are each independently selected from the group consisting of chlorine.

14. A modified solid support according to claim 1 wherein the solid support includes a material selected from the group consisting of organic polymer resin, silica, and surface grafted objects.

15. A method for synthesizing a modified solid support for use in solid phase synthesis comprising:

providing a solid support having an alkene extending therefrom; and performing a hydrosilylation reaction on the alkene extending from the solid support with a silane having the general formula:

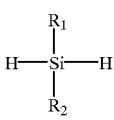

wherein $R_1$ and $R_2$ are each independently selected from the group consisting of alkyl, aryl, alkoxy, aryloxy, fluorine, chlorine, iodine and bromine.

16. A method according to claim 15 wherein the alkene has a terminal carbon substituted by R and R' which are each independently selected from the group consisting of hydrogen, alkyl, cycloalkyl, and aryl.

17. A method according to claim 15 wherein the hydrosilylation reaction is catalyzed by a catalyst selected from the group consisting of $H_2PtCl_{6b} \cdot 6H_2O$, $Pt(CH_2=CH_2)_2$, $Pt(PhCN)_2Cl_2$, $(PPh_3)_2Pt(CH_2=CH_2)_2Cl_2$, $Pt\{[Me(CH_2=CH)SiO]_4\}_m$, $Pt(PBu_3)_4$, $Pt(PPh_3)_4$, $PtCl_2(NH_3)_2$, $Pt_n[(CH_2=CH)Me_2SiOSiMe_2(CH=CH_2)]_m$, $Pt[P(OPh_3)]_4$, $Pt[P(OBu)_3]_4$, $RhCl(PPh_3)_3$, $RhCl_3$, $RuCl_3$, $PdCl_2 \cdot 2H_2O$.

18. A method for synthesizing a modified solid support for use in solid phase synthesis comprising:

providing a solid support having an alkene extending therefrom whose terminal carbon have substituents R and R' which are each independently selected from the group consisting of hydrogen, alkyl, cycloalkyl, and aryl;

performing a hydrosilylation reaction on the alkene extending from the solid support to form a compound having the general formula:

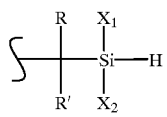

wherein $X_1$ is selected from the group consisting of alkyl, cycloalkyl, aryl, fluorine, chlorine, iodine and bromine and $X_2$ is selected from the group consisting of fluorine, chlorine, iodine and bromine; and reacting the compound with an alkyl, aryl, alkoxy, or aryloxy metal reagent where the alkyl or aryl metal reagent is selected such that a silane is formed having the general formula:

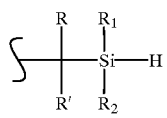

where $R_1$ and $R_2$ are each independently selected from the group consisting of alkyl, cycloalkyl, and aryl.

19. A method for synthesizing a modified solid support including the steps of:

providing a solid support having a linker group extending therefrom having the general formula:

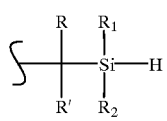

wherein

R and R' are each independently selected from the group consisting of hydrogen, alkyl, cycloalkyl, and aryl; and $R_1$ and $R_2$ are each independently selected from the group consisting of alkyl, cycloalkyl, aryl, alkoxy and aryloxy; and reacting the linker group with a reagent to form a modified linker group having the general formula:

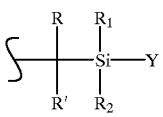

wherein Y is an activated group for nucleophilic substitution.

20. A method for synthesizing a modified solid support including the steps of:

providing a solid support having a linker group extending therefrom having the general formula:

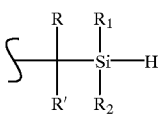

wherein

R and R' are each independently selected from the group consisting of hydrogen, alkyl, cycloalkyl, and aryl, and $R_1$ and $R_2$ are each independently selected from the group consisting of alkyl, cycloalkyl, aryl, alkoxy and aryloxy: and reacting the linker group with a reagent to form a modified linker group having the general formula:

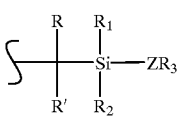

wherein

Z is selected from the group consisting of sulfur and oxygen and $R_3$ is selected from the group consisting of alkyl, cycloalkyl, and aryl.

21. A method for synthesizing a modified solid support including the steps of:

providing a solid support having a linker group extending therefrom having the general formula:

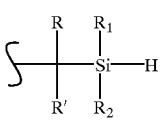

wherein

R and R' are each independently selected from the group consisting of hydrogen, alkyl, cycloalkyl, and aryl; and $R_1$ and $R_2$ are each independently selected from the group consisting of alkyl, cycloalkyl, aryl, alkoxy and aryloxy; and reacting the linker group with a reagent to form a modified linker group having the general formula:

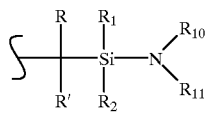

wherein
$R_{10}$ and $R_{11}$ are each independently selected such that $NR_{10}R_{11}$ forms a primary, secondary, or tertiary amine.

22. A method for synthesizing a modified solid support including the steps of:

providing a solid support having a linker group extending therefrom having the general formula:

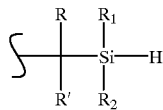

wherein
R and R' are each independently selected from the group consisting of hydrogen, alkyl, cycloalkyl, and aryl; and $R_1$ and $R_2$ are each independently selected from the group consisting of alkyl, cycloalkyl, aryl, alkoxy and aryloxy; and reacting the linker group with a reagent to form a modified linker group having the general formula:

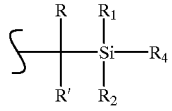

wherein
$R_4$ is independently selected from the group consisting of an alkane, alkene, alkyne, and aryl.

23. A method for synthesizing a modified solid support including the steps of:

providing a solid support having a linker group extending therefrom having the general formula:

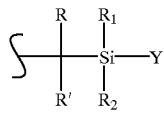

wherein
R and R' are each independently selected from the group consisting of hydrogen, alkyl, cycloalkyl, and aryl;

$R_1$ and $R_2$ are each independently selected from the group consisting of alkyl, cycloalkyl, aryl, alkoxy and aryloxy; and Y is an activated group for nucleophilic substitution other than chlorine; and reacting the linker group with a reagent to form a modified linker group having the general formula:

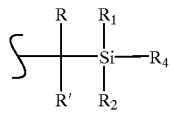

wherein
$R_4$ is independently selected from the group consisting of an alkane, alkene, alkyne, and aryl.

* * * * *